(12) United States Patent
Kim et al.

(10) Patent No.: US 10,080,216 B2
(45) Date of Patent: Sep. 18, 2018

(54) METHOD AND DEVICE FOR ACQUIRING UPLINK SYNCHRONIZATION IN WIRELESS ACCESS SYSTEM SUPPORTING CARRIER AGGREGATION

(71) Applicant: LG Electronics Inc., Seoul (KR)

(72) Inventors: Bonghoe Kim, Anyang-si (KR); Dongyoun Seo, Anyang-si (KR); Suckchel Yang, Anyang-si (KR); Joonkui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 165 days.

(21) Appl. No.: 14/651,088

(22) PCT Filed: Dec. 9, 2013

(86) PCT No.: PCT/KR2013/011343
§ 371 (c)(1),
(2) Date: Jun. 10, 2015

(87) PCT Pub. No.: WO2014/092411
PCT Pub. Date: Jun. 19, 2014

(65) Prior Publication Data
US 2015/0327218 A1   Nov. 12, 2015

Related U.S. Application Data

(60) Provisional application No. 61/735,992, filed on Dec. 11, 2012.

(51) Int. Cl.
*H04W 72/04* (2009.01)
*H04J 11/00* (2006.01)
(Continued)

(52) U.S. Cl.
CPC ....... *H04W 72/042* (2013.01); *H04J 11/0073* (2013.01); *H04L 5/0032* (2013.01);
(Continued)

(58) Field of Classification Search
None
See application file for complete search history.

(56) References Cited

U.S. PATENT DOCUMENTS 9,565,711 B2 * 2/2017 Jang .................... H04W 76/028
9,585,188 B2 * 2/2017 Jang .................... H04W 76/028
(Continued)

FOREIGN PATENT DOCUMENTS

CN  102244927 A  11/2011
CN  102271418 A  12/2011
(Continued)

*Primary Examiner* — Peter Chau
(74) *Attorney, Agent, or Firm* — Dentons US LLP

(57) ABSTRACT

The present invention provides a method used in a wireless access system supporting carrier aggregation (CA) for acquiring uplink synchronization from two or more geographically spaced cells, and a device for supporting the same. According to one embodiment of the present invention, a method for acquiring uplink synchronization in a wireless access system supporting CA can comprise the steps of: receiving, from a primacy cell (PCell), random access channel (RACH) information related to a first random access step for matching uplink synchronization in a secondary cell (SCell) to be added to CA; and performing the first random access step for matching uplink synchronization in the SCell on the basis of the RACH information.

10 Claims, 12 Drawing Sheets

(51) Int. Cl.
*H04L 5/00* (2006.01)
*H04W 28/18* (2009.01)
*H04W 74/08* (2009.01)
*H04W 56/00* (2009.01)

(52) U.S. Cl.
CPC ....... *H04W 28/18* (2013.01); *H04W 56/0005* (2013.01); *H04W 56/0055* (2013.01); *H04W 74/08* (2013.01); *H04J 2011/0096* (2013.01)

(56) References Cited

U.S. PATENT DOCUMENTS

| | | | | |
|---|---|---|---|---|
| 9,661,682 B2* | 5/2017 | Liao | ............ | H04W 36/08 |
| 2012/0069819 A1* | 3/2012 | Park | ............ | H04W 76/046 |
| | | | | 370/331 |
| 2012/0082107 A1 | 4/2012 | Ou et al. | | |
| 2012/0257569 A1 | 10/2012 | Jang et al. | | |
| 2012/0300714 A1 | 11/2012 | Ng et al. | | |
| 2013/0114574 A1* | 5/2013 | Ng | ............ | H04W 56/0015 |
| | | | | 370/336 |
| 2013/0250881 A1* | 9/2013 | Liao | ............ | H04W 36/08 |
| | | | | 370/329 |
| 2013/0250910 A1* | 9/2013 | Liao | ............ | H04W 76/27 |
| | | | | 370/331 |
| 2014/0023055 A1* | 1/2014 | Jeong | ............ | H04L 5/001 |
| | | | | 370/336 |
| 2014/0038605 A1* | 2/2014 | Behnamfar | ....... | H04W 36/0061 |
| | | | | 455/436 |
| 2014/0038616 A1* | 2/2014 | Burbidge | ............ | H04W 36/18 |
| | | | | 455/442 |
| 2014/0086213 A1* | 3/2014 | Kwon | ............ | H04W 36/0055 |
| | | | | 370/331 |
| 2014/0092812 A1* | 4/2014 | Jang | ............ | H04W 56/0045 |
| | | | | 370/328 |
| 2015/0003418 A1* | 1/2015 | Rosa | ............ | H04W 36/0005 |
| | | | | 370/331 |
| 2016/0050652 A1* | 2/2016 | Wu | ............ | H04L 5/001 |
| | | | | 370/329 |

FOREIGN PATENT DOCUMENTS

| | | |
|---|---|---|
| CN | 102548015 A | 7/2012 |
| KR | 1020100020900 | 2/2010 |
| KR | 1020100081897 | 7/2010 |
| WO | 2011119003 | 9/2011 |
| WO | 2012148236 | 11/2012 |
| WO | 2013139308 A1 | 9/2013 |

* cited by examiner

METHOD AND DEVICE FOR ACQUIRING UPLINK SYNCHRONIZATION IN WIRELESS ACCESS SYSTEM SUPPORTING CARRIER AGGREGATION

This application is a 35 USC § 371 National Stage entry of International Application No. PCT/KR2013/011343 filed on Dec. 9, 2013, and claims priority to U.S. Provisional Application No. 61/735,992 filed on Dec. 11, 2012, all of which are hereby incorporated by reference in their entireties as if fully set forth herein.

TECHNICAL FIELD

The present invention relates to a wireless access system supporting Carrier Aggregation (CA), and more particularly, to a method for acquiring uplink synchronization and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the problem lies on a method for acquiring uplink synchronization in a situation in which a plurality of cells are aggregated.

Another object of the present invention is to provide a method for acquiring uplink synchronization with a Secondary Cell (SCell) to be added in a CA environment.

Another object of the present invention is to provide a method for acquiring uplink synchronization with a geographically spaced SCell in a CA environment.

Another object of the present invention is to provide apparatuses supporting the above methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a wireless access system supporting Carrier Aggregation (CA), and more particularly, to a method for acquiring uplink synchronization with two or more geographically spaced cells and an apparatus supporting the same.

In an aspect of the present invention, provided herein is a method for acquiring uplink synchronization in a wireless access system supporting Carrier Aggregation (CA). The method includes receiving from a Primacy Cell (PCell) Random Access Channel (RACH) information related to a first random access procedure for acquiring uplink synchronization with a Secondary Cell (SCell) to be added to the CA, and performing the first random access procedure for acquiring uplink synchronization with the SCell, based on the RACH information. The RACH information includes resource allocation information and an RACH parameter, the resource allocation information indicating a resource area of the SCell in which the first random access procedure is to be performed and the RACH parameter being needed for generating an RACH preamble to be used in the first random access procedure. The SCell may be geographically spaced from the PCell.

The RACH information may be system information used in the SCell.

The method may further include receiving from the PCell a Physical Downlink Control Channel (PDCCH) order message indicating execution of a second random access procedure for acquiring uplink synchronization, and performing the second random access procedure with at least one of the PCell and the SCell, indicated by the PDCCH order message. The PDCCH order message may include information indicating a cell with which the second random access procedure is to be performed.

The SCell may be a leader SCell of a SCell group.

The random access procedure may be a contention-based initial random access procedure.

In another aspect of the present invention, a method for supporting acquisition of uplink synchronization in a wireless access system supporting CA includes negotiating RACH information related to a first random access procedure for acquiring uplink synchronization with a SCell to be added to the CA with the SCell by a PCell, acquiring RACH information including resource allocation information and an RACH parameter by the negotiation, the resource allocation information indicating a resource area of the SCell in which the first random access procedure is to be performed and the RACH parameter being needed for generating an RACH preamble to be used in the first random access procedure, and transmitting the RACH information to a UE. The SCell may be geographically spaced from the PCell.

The RACH information may be system information used in the SCell.

The method may further include transmitting to the UE a PDCCH order message indicating execution of a second random access procedure for acquiring uplink synchronization, and the PDCCH order message may include information indicating a cell with which the second random access procedure is to be performed.

The SCell may be a leader SCell of a SCell group.

The random access procedure may be a contention-based initial random access procedure.

In another aspect of the present invention, a UE for acquiring uplink synchronization in a wireless access system supporting CA includes a transmitter, a receiver, and a processor configured to support acquisition of uplink synchronization.

The processor is configured to receive from a PCell RACH information related to a first random access procedure for acquiring uplink synchronization with a SCell to be added to the CA by controlling the receiver, and to perform the first random access procedure for acquiring uplink synchronization with the SCell based on the RACH information by controlling the transmitter and the receiver, and the RACH information includes resource allocation information and an RACH parameter, the resource allocation information indicating a resource area of the SCell in which the first random access procedure is to be performed and the RACH parameter being needed for generating an RACH preamble to be used in the first random access procedure. The SCell may be geographically spaced from the PCell.

The RACH information may be system information used in the SCell.

The processor may be configured to receive a PDCCH order message indicating execution of a second random access procedure for acquiring uplink synchronization from the PCell through the receiver, and to perform the second random access procedure with at least one of the PCell and the SCell indicated by the PDCCH order message by controlling the receiver and the transmitter. The PDCCH order message may include information indicating a cell with which the second random access procedure is to be performed.

The SCell may be a leader SCell of a SCell group.

The random access procedure may be a contention-based initial random access procedure.

In another aspect of the present invention, a Base Station (BS) for supporting acquisition of uplink synchronization in a wireless access system supporting CA includes a transmitter, a receiver, and a processor configured to support acquisition of uplink synchronization.

The processor is configured to negotiate RACH information related to a first random access procedure for acquiring uplink synchronization with a SCell to be added to the CA with the SCell by a PCell of the BS by controlling the transmitter and the receiver, to acquire RACH information including resource allocation information and an RACH parameter by the negotiation, the resource allocation information indicating a resource area of the SCell in which the first random access procedure is to be performed and the RACH parameter being needed for generating an RACH preamble to be used in the first random access procedure, and to transmit the RACH information to a UE by controlling the transmitter. The SCell may be geographically spaced from the PCell.

The RACH information may be system information used in the SCell.

The processor may be configured to transmit to the UE a PDCCH order message indicating execution of a second random access procedure for acquiring uplink synchronization by controlling the transmitter. The PDCCH order message may include information indicating a cell with which the second random access procedure is to be performed.

The SCell may be a leader SCell of a SCell group.

The random access procedure may be a contention-based initial random access procedure.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First, uplink synchronization can be acquired fast in a situation in which a plurality of cells are aggregated.

Secondly, uplink synchronization with a Secondary Cell (SCell) to be added can be acquired in a CA environment.

Thirdly, uplink synchronization with a geographically spaced SCell can be acquired in a CA environment.

Fourthly, a Random Access Channel (RACH) procedure can be performed fast with a SCell by acquiring RACH information about the SCell from a Primary Cell (PCell) in advance.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
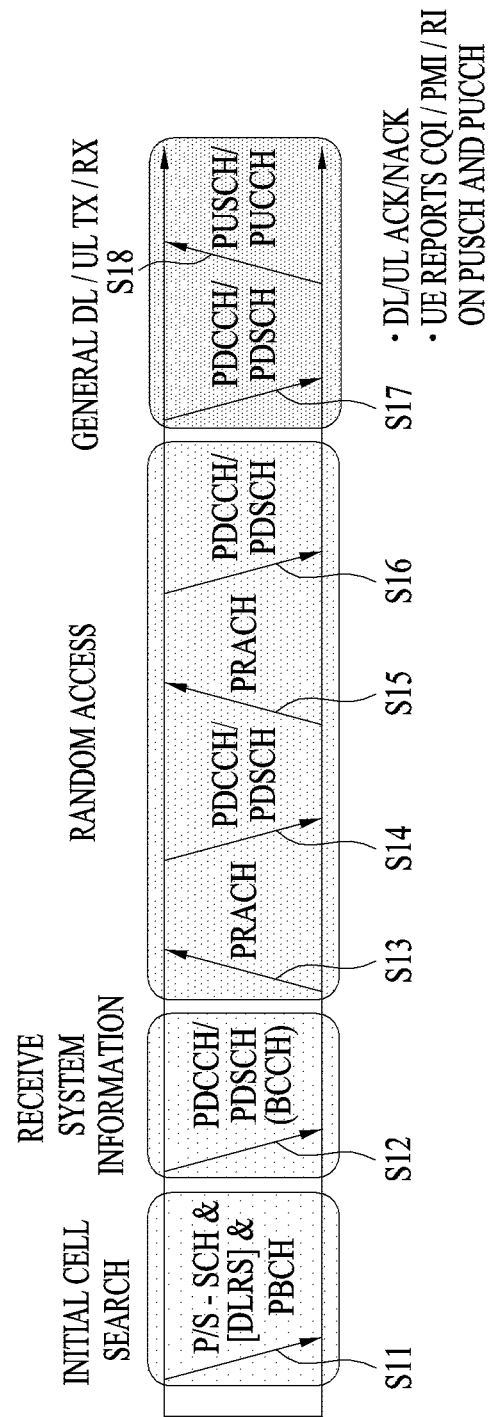
FIG. 1 illustrates physical channels and a general signal transmission method using the physical channels, which may be used in embodiments of the present invention.

Embodiments of the present invention described below in detail are used in a wireless access system supporting Carrier Aggregation (CA) and provide a method for acquiring uplink synchronization with two or more geographically spaced cells and an apparatus supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS36.211, 3GPP TS36.212, 3GPP TS36.213, and 3GPP TS36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, TA is interchangeable with time advance, timing adjustment, or time adjustment in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
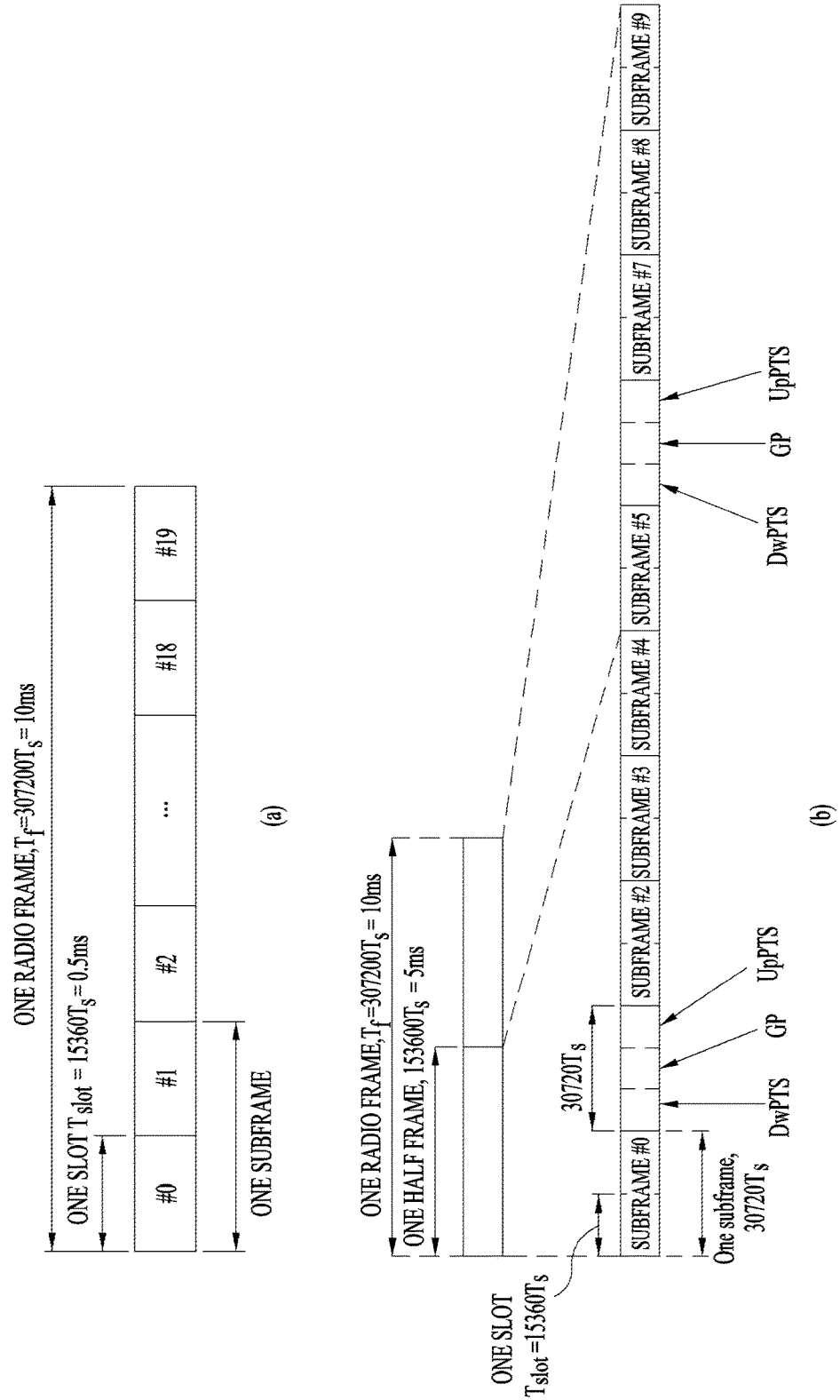
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | Extended cyclic prefix in downlink | | |
| | | UpPTS | | | UpPTS | |
| | | Normal | Extended | | Normal | Extended |
| Special subframe configuration | DwPTS | cyclic prefix in uplink | cyclic prefix in uplink | DwPTS | cyclic prefix in uplink | cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
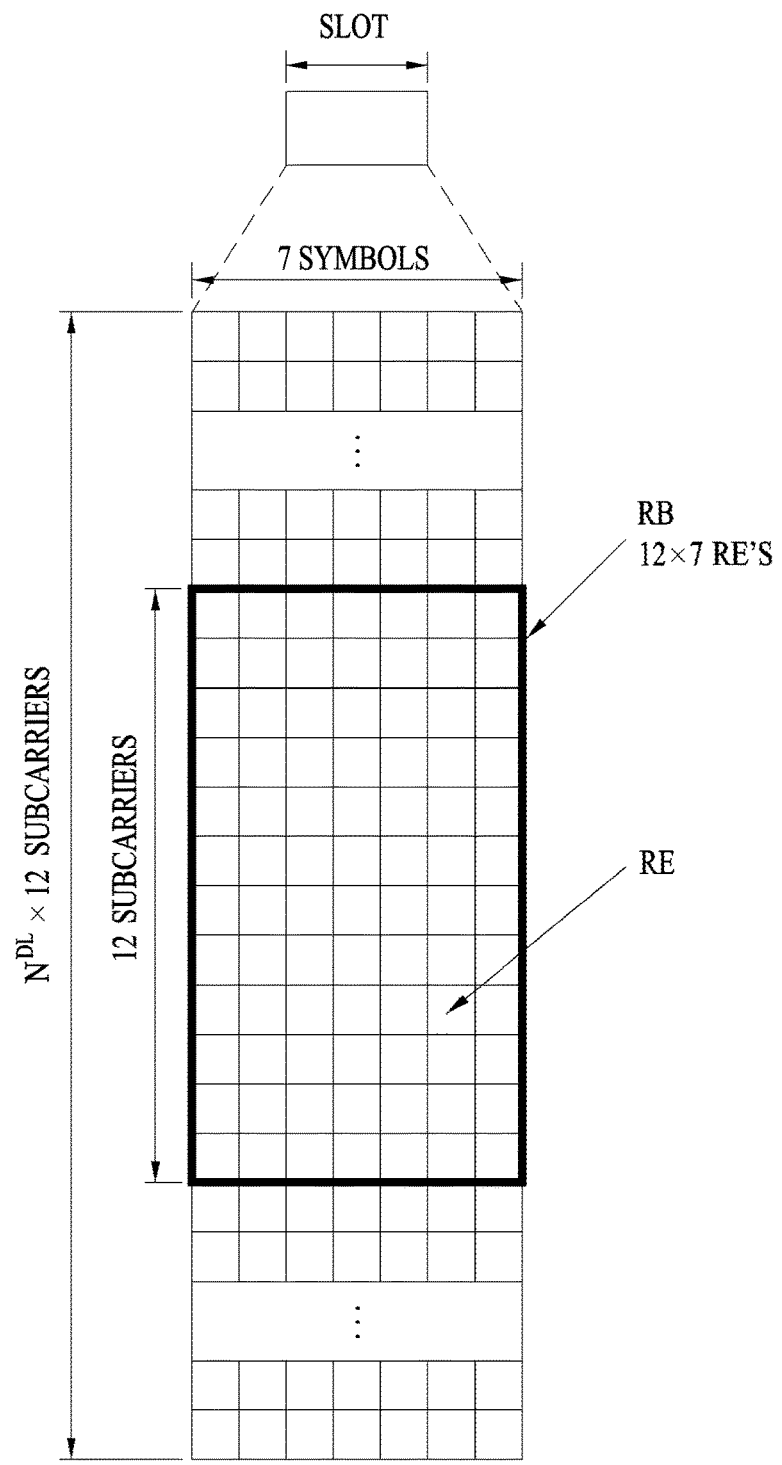
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
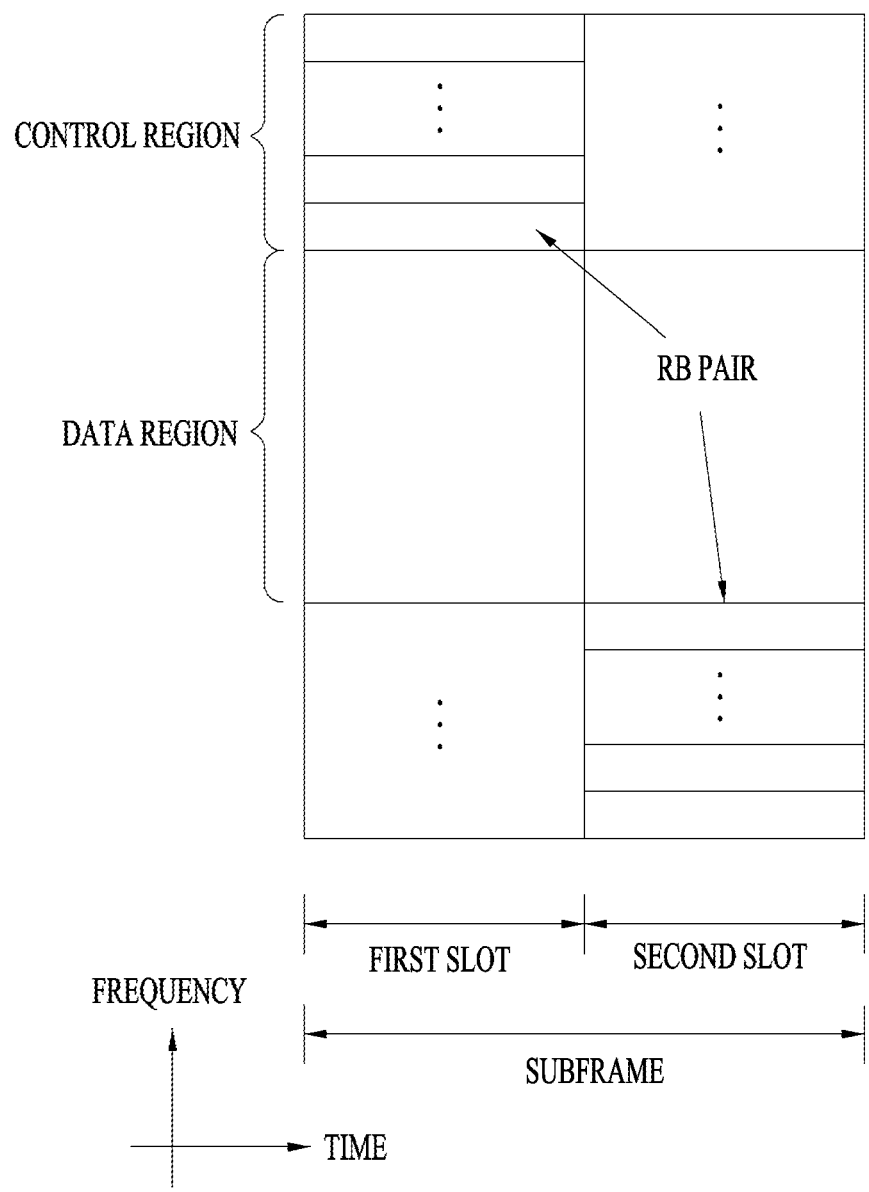
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
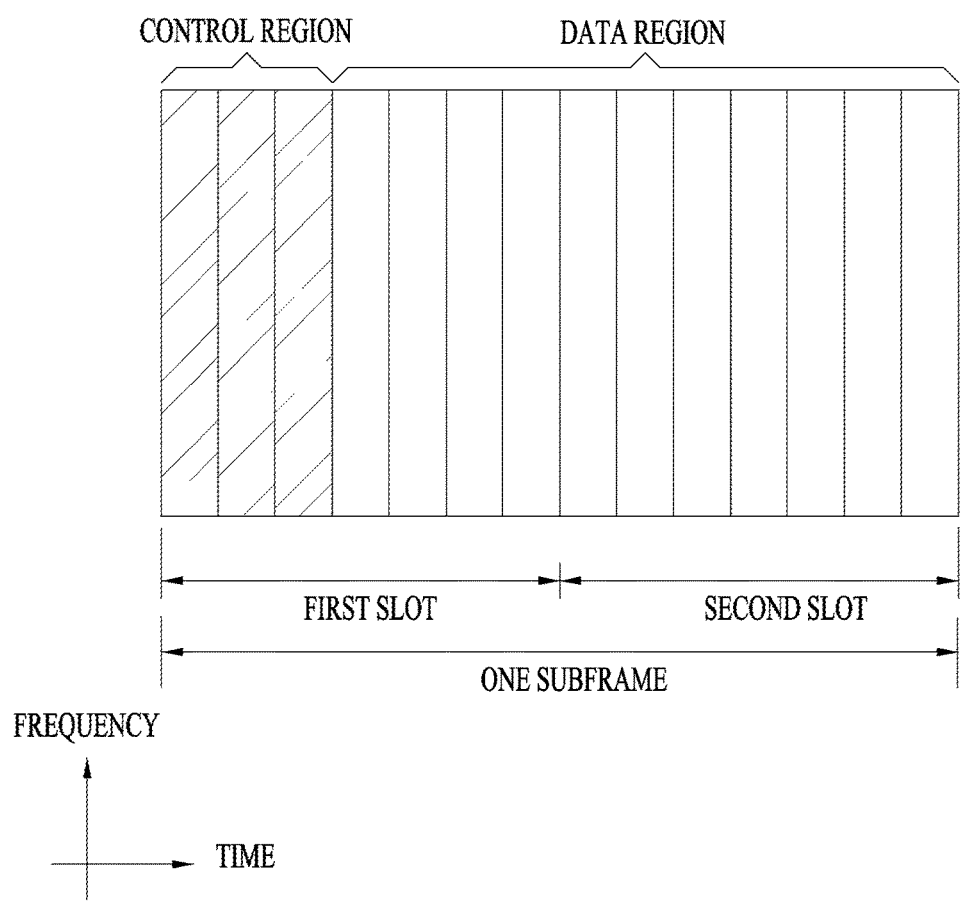
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment.

The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
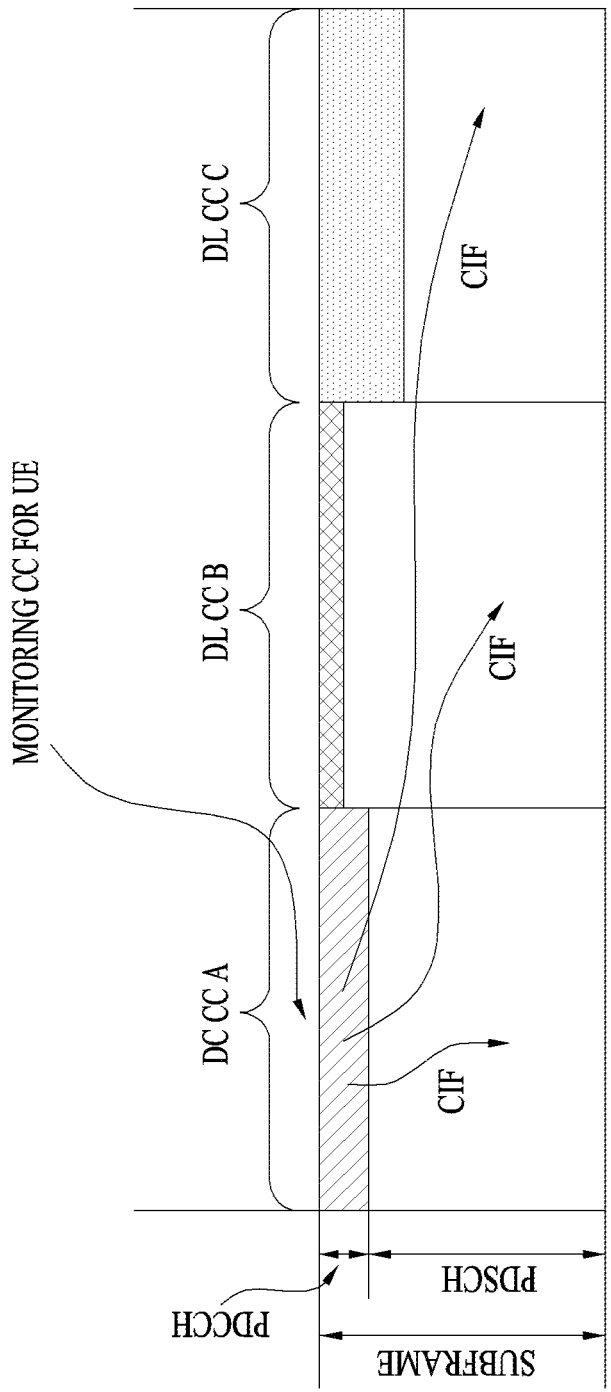
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Random Access Procedure 3.1 Contention-Based Random Access Procedure

Figure 7:
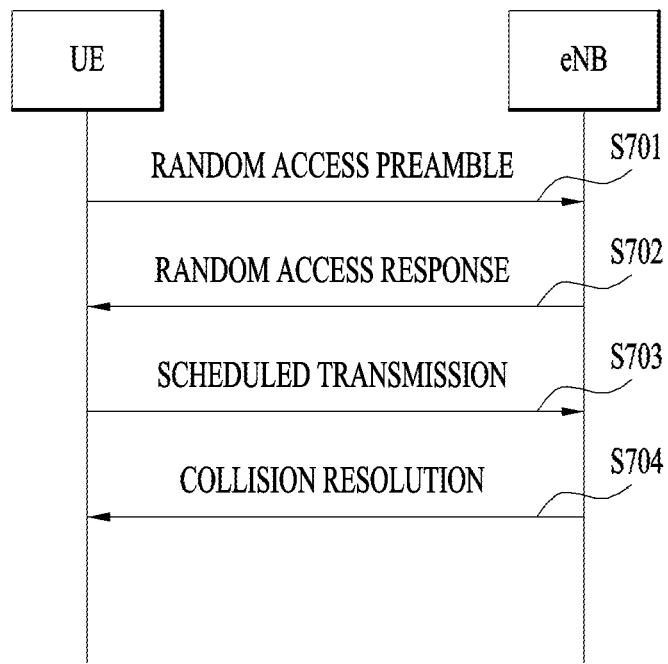
FIG. 7 is a diagram illustrating a signal flow for an operation between a User Equipment (UE) and an evolved Node B (eNB) in a contention-based random access procedure.

FIG. 7 illustrates an operation performed between a UE and an eNB in a contention-based random access procedure.

(1) Transmission of First Message (Msg1)

First, the UE may randomly select a random access preamble from a set of random access preambles indicated by system information or a Handover Command message, select Physical RACH (PRACH) resources, and transmit the selected random access preamble in the PRACH resources to the eNB (S701).

(2) Reception of Second Message (Msg2)

After transmitting the random access preamble in step S701, the UE attempts to receive a random access response within a random access response reception window indicated by the system information or the Handover Command message from the eNB (S702).

Random access response information may be transmitted in a Medium Access Control (MAC) Packet Data Unit (PDU) and the MAC PDU may be transmitted on a PDSCH in step S702. To receive information on the PDSCH successfully, the UE preferably monitors a Physical Downlink Control Channel (PDCCH). The PDCCH may deliver information about a UE to receive the PDSCH, time and frequency information about radio resources of the PDSCH, and information about the transport format of the PDSCH. Once the UE successfully receives the PDCCH directed to it, the UE may appropriately receive a random access response on the PDSCH based on information of the PDCCH. The random access response may include a Random Access Preamble Identifier (RAPID), an UpLink (UL) Grant indicating UL radio resources, a temporary Cell-Radio Network Temporary Identifier (C-RNTI), and a Timing Advance Command (TAC).

The reason for including an RAPID in the random access response is that one random access response may include random access response information for one or more UEs and thus it is necessary to indicate a UE for which the UL Grant, the temporary C-RNTI, and the TAC are valid. Herein, it is assumed that the UE selects an RAPID matching the random access preamble selected by the UE in step S701.

(3) Transmission of Third Message (Msg 3)

If the UE receives a random access response valid for it, the UE processes information included in the random access response. That is, the UE applies the TAC and stores the temporary C-RNTI. In addition, the UE may store data to be transmitted in response to the reception of the valid random access response in an Msg 3 buffer.

Meanwhile, the UE transmits data (i.e., a third message) to the eNB based on the received UL Grant (S703).

The third message should include an ID of the UE. In the contention-based random access procedure, the eNB may not determine which UE is performing the random access procedure and should identify the UE to resolve collision later.

(4) Reception of Fourth Message (Msg 4)

After transmitting the data including its ID based on the UL Grant included in the random access response, the UE awaits reception of a command from the eNB, for contention resolution. That is, the UE attempts to receive a PDCCH, for reception of a specific message (S704).

From the perspective of the physical layer, a Layer 1 (L1) random access procedure refers to transmission and reception of a random access preamble and a random access response in steps S701 and S702. The other messages are transmitted on a shared data channel by a higher layer, which is not considered to fall into the L1 random access procedure.

An RACH is configured to a size of 6 RBs in one or more contiguous subframes reserved for transmission of a random access preamble. The L1 random access procedure is triggered by a preamble transmission request from a higher layer. A preamble index, a target preamble reception power PREAMBLE_RECEIVED_TARGET_POWER, a matching RA-RNTI, and PRACH resources are part of the preamble transmission request, indicated by the higher layer.

Preamble transmission power $P_{PRACH}$ is calculated by [Equation 1].

$$P_{PRACH} = \min\{P_{CMAX,c}(i), \text{PREAMBLE\_RECEIVED\_TARGET\_POWER} + PL_c\}\_[\text{dBm}] \quad \text{[Equation 1]}$$

In [Equation 1], $P_{CMAX,c}(i)$ is transmission power defined for subframe i of a Primacy Cell (PCell) and $PL_c$ is an estimate of a DL pathloss of the PCell for the UE.

A preamble sequence is selected from a preamble sequence set, using a preamble index. A single preamble is transmitted in PRACH resources indicated by the transmission power $P_{PRACH}$ using the selected preamble sequence.

Detection of a PDCCH indicated by the RA-RNTI is attempted within a window controlled by the higher layer. If the PDCCH is detected, a corresponding DL-SCH transport block is transmitted to the higher layer. The higher layer analyzes the transport block and indicates a 20-bit UL Grant.

3.2 Contention-Free Random Access Procedure

Figure 8:
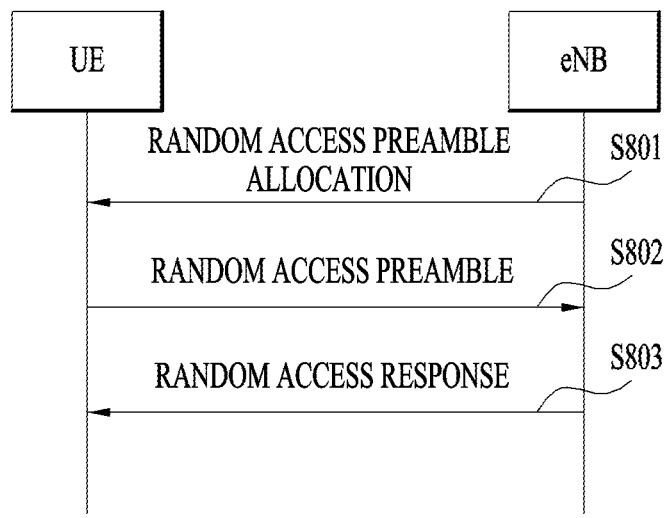
FIG. 8 is a diagram illustrating a signal flow for an operation between a UE and an eNB in a contention-free random access procedure.

FIG. 8 illustrates an operation between a UE and an eNB in a contention-free random access procedure.

Compared to the contention-based random access procedure illustrated in FIG. 8, the contention-free random access procedure ends simply by transmitting the first and second messages. However, before a UE transmits a random access preamble as a first message to an eNB, the eNB allocates the random access preamble to the UE. Then the UE transmits the random access preamble as the first message to the eNB and receives a random access response from the eNB. Thus, the random access procedure ends.

The contention-free random access procedure may be performed in the event of handover or upon request by a command from the eNB. In both cases, the contention-based random access procedure may also be performed.

Referring to FIG. 8, the eNB allocates a dedicated random access preamble that is not likely to collide to the UE, for the contention-free random access procedure. For example, the eNB may indicate the random access preamble to the UE by a Handover Command or a PDCCH order (S801).

The UE transmits the allocated dedicated random access preamble as the first message to the eNB and receives a random access response message in response to the random access preamble from the eNB. Random access response information is received in the same manner as in the contention-based random access procedure illustrated in FIG. 8 (S802 and S803).

3.3 PRACH Preamble

A detailed description will be given of the structure of a PRACH preamble transmitted on an RACH.

Figure 9:
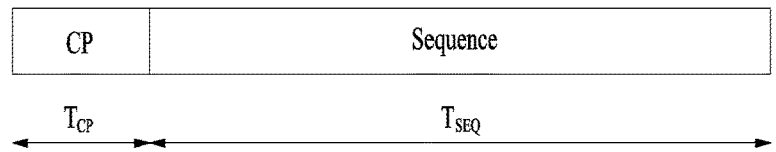
FIG. 9 illustrates an exemplary Physical Random Access Channel (PRACH) preamble that may be used in embodiments of the present invention.

FIG. 9 illustrates an exemplary PRACH preamble that may be used in embodiments of the present invention.

Referring to FIG. 9, the PRACH preamble is divided into a Cyclic Prefix (CP) of length $T_{CP}$ and a sequence of length $T_{SEQ}$. Parameters for the CP and the sequence are determined according to a frame structure and a random access configuration. [Table 2] lists CPs ($T_{CP}$) and sequences ($T_{SEQ}$) for different preamble formats.

TABLE 2

| Preamble format | $T_{CP}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4* | 448 · $T_s$ | 4096 · $T_s$ |

Transmission of a random access preamble is confined to specific time and frequency resources in frame structure type 2 and a specific subframe including a UpTPS. These resources are arranged in an ascending order of subframe numbers in a radio frame, starting from a PRB having the lowest index corresponding to index 0 in a frequency area.

PRACH resources within radio resources are indicated by PRACH resource indexes in the order illustrated in [Table 3] and [Table 4].

For frame structure type 1, preamble formats 0 to 3 are used. One random access resource per subframe at maximum is provided. [Table 3] lists subframes carrying allowed random access preambles for the preamble formats listed in [Table 2] and given configurations of frame structure type 1. A PRACH configuration index parameter, prach-ConfiguraitonIndex is indicated by a higher layer. The start of a random access preamble is adjusted to the start of a UL subframe in which a UE estimates $N_{TA}=0$. $N_{TA}$ is a time offset between a UL radio frame and a DL radio frame.

For PRACH configurations 0, 1, 2, 15, 16, 17, 18, 31, 32, 33, 34, 47, 48, 49, 50, and 63, a UE that will perform handover may estimate the absolute value of a relative time offset of radio frame j between a serving cell and a target cell to be less than $153600 \cdot T_s$. The first PRB $n_{PRB}^{RA}$ allocated to a PRACH opportunity considered for preamble formats 0, 1, 2, and 3 is defined as $n_{PRB}^{RA}=n_{PRB\_offset}^{RA}$. Herein, a PRACH frequency offset parameter, prach-FrequencyOffset $n_{PRBoffset}^{RA}$ is expressed as a PRB number configured by a higher layer, satisfying $0 \leq n_{PRBoffset}^{RA} \leq N_{RB}^{UL}-6$.

[Table 3] illustrates a mapping relationship among PRACH configuration indexes, preamble formats, system frame numbers, and subframe numbers.

TABLE 3

| PRACH Configuration Index | Preamble Format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

For preamble formats 0 to 4 of frame structure type 2, a plurality of random access resources may exist in a UL frame according to a UL/DL configuration. [Table 4] below illustrates combinations of a preamble format, a PRACH density value $D_{RA}$, and a version index $r_{RA}$ with respect to PRACH configuration indexes available in frame structure type 2. A PRACH configuration index parameter, PrachConfigurationIndex is given by a higher layer. For frame structure type 2 of PRACH configurations 0, 1, 2, 20, 21, 22, 30, 31, 32, 40, 41, 42, 48, 49, and 50 or PRACH configurations 51, 53, 54, 55, 56, and 57 in UL/DL configurations 3, 4, and 5, a UE that will perform handover may estimate the absolute value of a relative time offset of radio frame j between a serving cell and a target cell to be less than $153600 \cdot T_s$.

TABLE 4

| PRACH configuration Index | Preamble Format | Density Per 10 ms $D_{RA}$ | Version $r_{RA}$ |
| --- | --- | --- | --- |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |

TABLE 4-continued

| PRACH configuration Index | Preamble Format | Density Per 10 ms $D_{RA}$ | Version $r_{RA}$ |
|---|---|---|---|
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | N/A | N/A | N/A |
| 59 | N/A | N/A | N/A |
| 60 | N/A | N/A | N/A |
| 61 | N/A | N/A | N/A |
| 62 | N/A | N/A | N/A |
| 63 | N/A | N/A | N/A |

[Table 5] below illustrates mapping of physical resources to other random access opportunities needed for a specific PRACH density $D_{RA}$.

TABLE 5

| PRACH configuration Index (표 4참조) | UL/DL configuration (See Table 4.2-2) | | | | | | |
|---|---|---|---|---|---|---|---|
| | 0 | 1 | 2 | 3 | 4 | 5 | 6 |
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 2 | (0, 1, 1, 2) | (0, 1, 1, 1) | (0, 1, 1, 0) | (0, 1, 0, 1) | (0, 1, 0, 0) | N/A | (0, 1, 1, 1) |
| 3 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) |
| 4 | (0, 0, 1, 2) | (0, 0, 1, 1) | (0, 0, 1, 0) | (0, 0, 0, 1) | (0, 0, 0, 0) | N/A | (0, 0, 1, 1) |
| 5 | (0, 0, 0, 1) | (0, 0, 0, 0) | N/A | (0, 0, 0, 0) | N/A | N/A | (0, 0, 0, 1) |
| 6 | (0, 0, 0, 2) (0, 1, 2) | (0, 0, 0, 1) (0, 0, 1, 1) | (0, 0, 0, 0) (0, 0, 1, 0) | (0, 0, 0, 1) (0, 0, 0, 2) | (0, 0, 0, 0) (0, 0, 0, 1) | (0, 0, 0, 0) (1, 0, 0, 0) | (0, 0, 0, 2) (0, 0, 1, 1) |
| 7 | (0, 0, 0, 1) (0, 0, 1, 1) | (0, 0, 0, 0) (0, 0, 1, 0) | N/A | (0, 0, 0, 0) (0, 0, 0, 2) | N/A | N/A | (0, 0, 0, 1) (0, 0, 1, 0) |
| 8 | (0, 0, 0, 0) (0, 0, 1, 0) | N/A | N/A | (0, 0, 0, 0) (0, 0, 0, 1) | N/A | N/A | (0, 0, 0, 0) (0, 0, 1, 1) |
| 9 | (0, 0, 0, 1) (0, 0, 0, 2) (0, 0, 1, 2) | (0, 0, 0, 0) (0, 0, 0, 1) (0, 0, 1, 1) | (0, 0, 0, 0) (0, 0, 1, 0) (1, 0, 0, 0) | (0, 0, 0, 0) (0, 0, 0, 1) (0, 0, 0, 2) | (0, 0, 0, 0) (0, 0, 0, 1) (1, 0, 0, 1) | (0, 0, 0, 0) (1, 0, 0, 0) (2, 0, 0, 0) | (0, 0, 0, 2) (0, 0, 0, 2) (0, 0, 1, 1) |
| 10 | (0, 0, 0, 0) (0, 0, 1, 0) (0, 0, 1, 1) | (0, 0, 0, 1) (0, 0, 1, 0) (0, 0, 1, 1) | (0, 0, 0, 0) (0, 0, 1, 0) (1, 0, 1, 0) | N/A | (0, 0, 0, 0) (0, 0, 0, 1) (1, 0, 0, 0) | N/A | (0, 0, 0, 0) (0, 0, 0, 2) (0, 0, 1, 0) |
| 11 | N/A (0, 0, 0, 1) (0, 0, 1, 0) | (0, 0, 0, 0) | N/A | N/A | N/A | N/A | (0, 0, 0, 1) (0, 0, 1, 0) (0, 0, 1, 1) |
| 12 | (0, 0, 0, 1) (0, 0, 0, 2) (0, 0, 1, 1) (0, 0, 1, 2) | (0, 0, 0, 0) (0, 0, 0, 1) (0, 0, 1, 0) (0, 0, 1, 1) | (0, 0, 0, 0) (0, 0, 1, 0) (1, 0, 0, 0) (1, 0, 1, 0) | (0, 0, 0, 0) (0, 0, 0, 1) (0, 0, 0, 2) (1, 0, 0, 2) | (0, 0, 0, 0) (0, 0, 0, 1) (1, 0, 0, 1) (1, 0, 0, 1) | (0, 0, 0, 0) (1, 0, 0, 0) (2, 0, 0, 0) (3, 0, 0, 0) | (0, 0, 0, 1) (0, 0, 0, 2) (0, 0, 1, 0) (0, 0, 1, 1) |
| 13 | (0, 0, 0, 0) (0, 0, 0, 2) (0, 0, 1, 0) (0, 0, 1, 2) | N/A | N/A | (0, 0, 0, 0) (0, 0, 0, 1) (0, 0, 0, 2) (1, 0, 0, 1) | N/A | N/A | (0, 0, 0, 0) (0, 0, 0, 1) (0, 0, 0, 2) (0, 0, 1, 1) |
| 14 | (0, 0, 0, 0) (0, 0, 0, 1) (0, 0, 1, 0) (0, 0, 1, 1) | N/A | N/A | (0, 0, 0, 0) (0, 0, 0, 1) (0, 0, 0, 2) (1, 0, 0, 0) | N/A | N/A | (0, 0, 0, 0) (0, 0, 0, 2) (0, 0, 1, 0) (0, 0, 1, 1) |
| 15 | (0, 0, 0, 0) (0, 0, 0, 1) (0, 0, 0, 2) (0, 0, 1, 1) (0, 0, 1, 2) | (0, 0, 0, 0) (0, 0, 0, 1) (0, 0, 1, 0) (0, 0, 1, 1) (1, 0, 0, 1) | (0, 0, 0, 0) (0, 0, 1, 0) (1, 0, 0, 0) (1, 0, 1, 0) (2, 0, 0, 0) | (0, 0, 0, 0) (0, 0, 0, 1) (0, 0, 0, 2) (1, 0, 0, 1) (1, 0, 0, 2) | (0, 0, 0, 0) (0, 0, 0, 1) (1, 0, 0, 0) (1, 0, 0, 1) (2, 0, 0, 1) | (0, 0, 0, 0) (1, 0, 0, 0) (2, 0, 0, 0) (3, 0, 0, 0) (4, 0, 0, 0) | (0, 0, 0, 0) (0, 0, 0, 1) (0, 0, 0, 2) (0, 0, 1, 0) (0, 0, 1, 1) |
| 16 | (0, 0, 0, 1) (0, 0, 0, 2) (0, 0, 1, 0) (0, 0, 1, 1) (0, 0, 1, 2) | (0, 0, 0, 0) (0, 0, 0, 1) (0, 0, 1, 0) (0, 0, 1, 1) (1, 0, 1, 1) | (0, 0, 0, 0) (0, 0, 1, 0) (1, 0, 0, 0) (1, 0, 1, 0) (2, 0, 1, 0) | (0, 0, 0, 0) (0, 0, 0, 1) (0, 0, 0, 2) (1, 0, 0, 0) (1, 0, 0, 2) | (0, 0, 0, 0) (0, 0, 0, 1) (1, 0, 0, 0) (1, 0, 0, 0) (2, 0, 0, 0) | N/A | N/A |

TABLE 5-continued

| PRACH configuration Index (표4참조) | UL/DL configuration (See Table 4.2-2) | | | | | | |
|---|---|---|---|---|---|---|---|
| | 0 | 1 | 2 | 3 | 4 | 5 | 6 |
| 17 | (0, 0, 0, 0) (0, 0, 0, 1) (0, 0, 0, 2) (0, 0, 1, 0) (0, 0, 1, 2) | (0, 0, 0, 0) (0, 0, 0, 1) (0, 0, 1, 0) (0, 0, 1, 1) (1, 0, 0, 0) | N/A | (0, 0, 0, 0) (0, 0, 0, 1) (0, 0, 0, 2) (1, 0, 0, 0) (1, 0, 0, 1) | N/A | N/A | N/A |
| 18 | (0, 0, 0, 0) (0, 0, 0, 1) (0, 0, 0, 2) (0, 0, 1, 0) (0, 0, 1, 1) (0, 0, 1, 2) | (0, 0, 0, 0) (0, 0, 0, 1) (0, 0, 1, 0) (0, 0, 1, 1) (1, 0, 0, 1) (1, 0, 1, 1) | (0, 0, 0, 0) (0, 0, 1, 0) (1, 0, 0, 0) (1, 0, 1, 0) (2, 0, 0, 0) (2, 0, 1, 0) | (0, 0, 0, 0) (0, 0, 0, 1) (0, 0, 0, 2) (1, 0, 0, 0) (1, 0, 0, 1) (1, 0, 0, 2) | (0, 0, 0, 0) (0, 0, 0, 1) (1, 0, 0, 0) (1, 0, 0, 1) (2, 0, 0, 0) (2, 0, 0, 1) | (0, 0, 0, 0) (1, 0, 0, 0) (2, 0, 0, 0) (3, 0, 0, 0) (4, 0, 0, 0) (5, 0, 0, 0) | (0, 0, 0, 0) (0, 0, 0, 1) (0, 0, 0, 2) (0, 0, 1, 0) (0, 0, 1, 1) (1, 0, 0, 2) |
| 19 | N/A | (0, 0, 0, 0) (0, 0, 0, 1) (0, 0, 1, 0) (0, 0, 1, 1) (1, 0, 0, 0) (1, 0, 1, 0) | N/A | N/A | N/A | N/A | (0, 0, 0, 0) (0, 0, 0, 1) (0, 0, 0, 2) (0, 0, 1, 0) (0, 0, 1, 1) (1, 0, 1, 1) |
| 20/30 | (0, 1, 0, 1) | (0, 1, 0, 0) | N/A | (0, 1, 0, 1) | (0, 1, 0, 0) | N/A | (0, 1, 0, 1) |
| 21/31 | (0, 2, 0, 1) | (0, 2, 0, 0) | N/A | (0, 2, 0, 1) | (0, 2, 0, 0) | N/A | (0, 2, 0, 1) |
| 22/32 | (0, 1, 1, 1) | (0, 1, 1, 0) | N/A | N/A | N/A | N/A | (0, 1, 1, 0) |
| 23/33 | (0, 0, 0, 1) | (0, 0, 0, 0) | N/A | (0, 0, 0, 1) | (0, 0, 0, 0) | N/A | (0, 0, 0, 1) |
| 24/34 | (0, 0, 1, 1) | (0, 0, 1, 0) | N/A | N/A | N/A | N/A | (0, 0, 1, 0) |
| 25/35 | (0, 0, 0, 1) (0, 0, 1, 1) | (0, 0, 0, 0) (0, 0, 1, 0) | N/A | (0, 0, 0, 1) (1, 0, 0, 1) | (0, 0, 0, 0) (1, 0, 0, 0) | N/A | (0, 0, 0, 1) (0, 0, 1, 0) |
| 26/36 | (0, 0, 0, 1) (0, 0, 1, 1) (1, 0, 0, 1) | (0, 0, 0, 0) (0, 0, 1, 0) (1, 0, 0, 0) | N/A | (0, 0, 0, 1) (1, 0, 0, 1) (2, 0, 0, 1) | (0, 0, 0, 0) (1, 0, 0, 0) (2, 0, 0, 0) | N/A | (0, 0, 0, 1) (0, 0, 1, 0) (1, 0, 0, 1) |
| 27/37 | (0, 0, 0, 1) (0, 0, 1, 1) (1, 0, 0, 1) (1, 0, 1, 1) | (0, 0, 0, 0) (0, 0, 1, 0) (1, 0, 0, 0) (1, 0, 1, 0) | N/A | (0, 0, 0, 1) (1, 0, 0, 1) (2, 0, 0, 1) (3, 0, 0, 1) | (0, 0, 0, 0) (1, 0, 0, 0) (2, 0, 0, 0) (3, 0, 0, 0) | N/A | (0, 0, 0, 1) (0, 0, 1, 0) (1, 0, 0, 1) (1, 0, 1, 0) |
| 28/38 | (0, 0, 0, 1) (0, 0, 1, 1) (1, 0, 0, 1) (1, 0, 1, 1) (2, 0, 0, 1) | (0, 0, 0, 0) (0, 0, 1, 0) (1, 0, 0, 0) (1, 0, 1, 0) (2, 0, 0, 0) | N/A | (0, 0, 0, 1) (1, 0, 0, 1) (2, 0, 0, 1) (3, 0, 0, 1) (4, 0, 0, 1) | (0, 0, 0, 0) (1, 0, 0, 0) (2, 0, 0, 0) (3, 0, 0, 0) (4, 0, 0, 0) | N/A | (0, 0, 0, 1) (0, 0, 1, 0) (1, 0, 0, 1) (1, 0, 1, 0) (2, 0, 0, 1) |
| 29/39 | (0, 0, 0, 1) (0, 0, 1, 1) (1, 0, 0, 1) (1, 0, 1, 1) (2, 0, 0, 1) (2, 0, 1, 1) | (0, 0, 0, 0) (0, 0, 1, 0) (1, 0, 0, 0) (1, 0, 1, 0) (2, 0, 0, 0) (2, 0, 1, 0) | N/A | (0, 0, 0, 1) (1, 0, 0, 1) (2, 0, 0, 1) (3, 0, 0, 1) (4, 0, 0, 1) (5, 0, 0, 1) | (0, 0, 0, 0) (1, 0, 0, 0) (2, 0, 0, 0) (3, 0, 0, 0) (4, 0, 0, 0) (5, 0, 0, 0) | N/A | (0, 0, 0, 1) (0, 0, 1, 0) (1, 0, 0, 1) (1, 0, 1, 0) (2, 0, 0, 1) (2, 0, 1, 0) |
| 40 | (0, 1, 0, 0) | N/A | N/A | (0, 1, 0, 0) | N/A | N/A | (0, 1, 0, 0) |
| 41 | (0, 2, 0, 0) | N/A | N/A | (0, 2, 0, 0) | N/A | N/A | (0, 2, 0, 0) |
| 42 | (0, 1, 1, 0) | N/A | N/A | N/A | N/A | N/A | N/A |
| 43 | (0, 0, 0, 0) | N/A | N/A | (0, 0, 0, 0) | N/A | N/A | (0, 0, 0, 0) |
| 44 | (0, 0, 1, 0) | N/A | N/A | N/A | N/A | N/A | N/A |
| 45 | (0, 0, 0, 0) (0, 0, 1, 0) | N/A | N/A | (0, 0, 0, 0) (1, 0, 0, 0) | N/A | N/A | (0, 0, 0, 0) (1, 0, 0, 0) |
| 46 | (0, 0, 0, 0) (0, 0, 1, 0) (1, 0, 0, 0) | N/A | N/A | (0, 0, 0, 0) (1, 0, 0, 0) (2, 0, 0, 0) | N/A | N/A | (0, 0, 0, 0) (1, 0, 0, 0) (2, 0, 0, 0) |
| 47 | (0, 0, 0, 0) (0, 0, 1, 0) (1, 0, 0, 0) (1, 0, 1, 0) | N/A | N/A | (0, 0, 0, 0) (1, 0, 0, 0) (2, 0, 0, 0) (3, 0, 0, 0) | N/A | N/A | (0, 0, 0, 0) (1, 0, 0, 0) (2, 0, 0, 0) (3, 0, 0, 0) |
| 48 | (0, 1, 0, *) | (0, 1, 0, *) | (0, 1, 0, *) | (0, 1, 0, *) | (0, 1, 0, *) | (0, 1, 0, *) | (0, 1, 0, *) |
| 49 | (0, 2, 0, *) | (0, 2, 0, *) | (0, 2, 0, *) | (0, 2, 0, *) | (0, 2, 0, *) | (0, 2, 0, *) | (0, 2, 0, *) |
| 50 | (0, 1, 1, *) | (0, 1, 1, *) | (0, 1, 1, *) | N/A | N/A | N/A | (0, 1, 1, *) |
| 51 | (0, 0, 0, *) | (0, 0, 0, *) | (0, 0, 0, *) | (0, 0, 0, *) | (0, 0, 0, *) | (0, 0, 0, *) | (0, 0, 0, *) |
| 52 | (0, 0, 1, *) | (0, 0, 1, *) | (0, 0, 1, *) | N/A | N/A | N/A | (0, 0, 1, *) |
| 53 | (0, 0, 0, *) (0, 0, 1, *) | (0, 0, 0, *) (0, 0, 1, *) | (0, 0, 0, *) (0, 0, 1, *) | (0, 0, 0, *) (1, 0, 0, *) | (0, 0, 0, *) (1, 0, 0, *) | (0, 0, 0, *) (1, 0, 0, *) | (0, 0, 0, *) (0, 0, 1, *) |
| 54 | (0, 0, 0, *) (0, 0, 1, *) (1, 0, 0, *) | (0, 0, 0, *) (0, 0, 1, *) (1, 0, 0, *) | (0, 0, 0, *) (0, 0, 1, *) (1, 0, 0, *) | (0, 0, 0, *) (1, 0, 0, *) (2, 0, 0, *) | (0, 0, 0, *) (1, 0, 0, *) (2, 0, 0, *) | (0, 0, 0, *) (1, 0, 0, *) (2, 0, 0, *) | (0, 0, 0, *) (0, 0, 1, *) (1, 0, 0, *) |
| 55 | (0, 0, 0, *) (0, 0, 1, *) (1, 0, 0, *) (1, 0, 1, *) | (0, 0, 0, *) (0, 0, 1, *) (1, 0, 0, *) (1, 0, 1, *) | (0, 0, 0, *) (0, 0, 1, *) (1, 0, 0, *) (1, 0, 1, *) | (0, 0, 0, *) (1, 0, 0, *) (2, 0, 0, *) (3, 0, 0, *) | (0, 0, 0, *) (1, 0, 0, *) (2, 0, 0, *) (3, 0, 0, *) | (0, 0, 0, *) (1, 0, 0, *) (2, 0, 0, *) (3, 0, 0, *) | (0, 0, 0, *) (0, 0, 1, *) (1, 0, 0, *) (1, 0, 1, *) |
| 56 | (0, 0, 0, *) (0, 0, 1, *) (1, 0, 0, *) (1, 0, 1, *) (2, 0, 0, *) | (0, 0, 0, *) (0, 0, 1, *) (1, 0, 0, *) (1, 0, 1, *) (2, 0, 0, *) | (0, 0, 0, *) (0, 0, 1, *) (1, 0, 0, *) (1, 0, 1, *) (2, 0, 0, *) | (0, 0, 0, *) (1, 0, 0, *) (2, 0, 0, *) (3, 0, 0, *) (4, 0, 0, *) | (0, 0, 0, *) (1, 0, 0, *) (2, 0, 0, *) (3, 0, 0, *) (4, 0, 0, *) | (0, 0, 0, *) (1, 0, 0, *) (2, 0, 0, *) (3, 0, 0, *) (4, 0, 0, *) | (0, 0, 0, *) (0, 0, 1, *) (1, 0, 0, *) (1, 0, 1, *) (2, 0, 0, *) |

TABLE 5-continued

| PRACH configuration Index | UL/DL configuration (See Table 4.2-2) | | | | | | |
|---|---|---|---|---|---|---|---|
| (표4참조) | 0 | 1 | 2 | 3 | 4 | 5 | 6 |
| 57 | (0, 0, 0, *) | (0, 0, 0, *) | (0, 0, 0, *) | (0, 0, 0, *) | (0, 0, 0, *) | (0, 0, 0, *) | (0, 0, 0, *) |
|  | (0, 0, 1, *) | (0, 0, 1, *) | (0, 0, 1, *) | (1, 0, 0, *) | (1, 0, 0, *) | (1, 0, 0, *) | (0, 0, 1, *) |
|  | (1, 0, 0, *) | (1, 0, 0, *) | (1, 0, 0, *) | (2, 0, 0, *) | (2, 0, 0, *) | (2, 0, 0, *) | (1, 0, 0, *) |
|  | (1, 0, 1, *) | (1, 0, 1, *) | (1, 0, 1, *) | (3, 0, 0, *) | (3, 0, 0, *) | (3, 0, 0, *) | (1, 0, 1, *) |
|  | (2, 0, 0, *) | (2, 0, 0, *) | (2, 0, 0, *) | (4, 0, 0, *) | (4, 0, 0, *) | (4, 0, 0, *) | (2, 0, 0, *) |
|  | (2, 0, 1, *) | (2, 0, 1, *) | (2, 0, 1, *) | (5, 0, 0, *) | (5, 0, 0, *) | (5, 0, 0, *) | (2, 0, 1, *) |
| 58 | N/A | N/A | N/A | N/A | N/A | N/A | N/A |
| 59 | N/A | N/A | N/A | N/A | N/A | N/A | N/A |
| 60 | N/A | N/A | N/A | N/A | N/A | N/A | N/A |
| 61 | N/A | N/A | N/A | N/A | N/A | N/A | N/A |
| 62 | N/A | N/A | N/A | N/A | N/A | N/A | N/A |
| 63 | N/A | N/A | N/A | N/A | N/A | N/A | N/A |

In [Table 5], four pairs of each format ($f_{RA}$, $t_{RA}^{(0)}$, $t_{RA}^{(1)}$, $t_{RA}^{(2)}$) indicate the positions of specific random access resources. Herein, $f_{RA}$ indicates a frequency resource index in a considered time instance, $t_{RA}^{(0)}=0,1,2$ indicates whether corresponding resources are (re)generated in all of even-numbered radio frames or odd-numbered radio frames, $t_{RA}^{(1)}=0,1$ indicates whether random access resources are located in the first or second half frame, and $t_{RA}^{(2)}$ indicates the number of a UL subframe in which a preamble starts. UL subframe numbers start to be counted, starting from the first UL subframe between two contiguous DL-UL switch points as 0, and is excluded from preamble format 4. Herein, $t_{RA}^{(2)}$ is expressed as (*).

The start of random access preamble formats 0 to 3 is adjusted to the start of a UL subframe for which a UE estimates that $N_{TA}=0$, and random access preamble 4 starts $4832 \cdot T_s$ before the end of a UpPTS. Herein, $N_{TA}$ indicates a time offset between a UL radio frame and a DL radio frame.

If time multiplexing is not sufficient to maintain all opportunities of each PRACH configuration needed for a specific density value $D_{RA}$, the opportunities are allocated to time resources in a time resource-first manner and then to frequency resources. For preamble formats 0 to 3, frequency multiplexing is performed according to [Equation 2].

$$n_{PRB}^{RA} = \begin{cases} n_{PRB\ offset}^{RA} + 6\left\lfloor \frac{f_{RA}}{2} \right\rfloor, & \text{if } f_{RA} \bmod 2 = 0 \\ N_{RB}^{UL} - 6 - n_{PRB\ offset}^{RA} - 6\left\lfloor \frac{f_{RA}}{2} \right\rfloor, & \text{otherwise} \end{cases}$$ [Equation 2]

In [Equation 2], $N_{RB}^{UL}$ represents the number of UL RBs, $n_{PRB}^{RA}$ represents the first PRB allocated to a PRACH opportunity, and $n_{PRB\ offset}^{RA}$ represents the first PRB available for a PRACH expressed as the number of PRBs configured by a higher layer, satisfying $0 \leq n_{PRBoffset}^{RA} \leq N_{RB}^{UL} - 6$.

For preamble format 4, frequency multiplexing is performed according to [Equation 3].

$$n_{PRB}^{RA} = \begin{cases} 6f_{RA}, & \text{if } ((n_f \bmod 2) \times (2 - N_{SP}) + t_{RA}^{(1)}) \bmod 2 = 0 \\ N_{RB}^{UL} - 6(f_{RA} + 1), & \text{otherwise} \end{cases}$$ [Equation 3]

In [Equation 3], $n_f$ indicates a system frame number and $N_{SP}$ indicates the number of DL-UL switch points in a radio frame.

For two frame structure types 1 and 2, each radio access preamble has a bandwidth corresponding to 6 contiguous RBs.

3.4 Method for Generating RACH Preamble

Now, a method for generating an RACH preamble will be described below. A random access preamble (i.e., an RACH preamble) is generated from a Zadoff Chu (ZC) sequence including a Zero Correlation Zone (ZCZ) generated from one or more Root Zadoff Chu (RZC) sequences. A network configures a set of preamble sequences allowed for a UE.

64 preambles are available for each cell. A set of 64 preamble sequences including all possible cyclic shifts of an RZC sequence for a logical index RACH_ROOT_SEQUENCE are searched for in an ascending order of cyclic shifts in the cell. The root index RACH_ROOT_SEQUENCE is broadcast as part of system information. If the 64 preambles are not generated from a single RZC, additional preamble sequences may be acquired from root indexes successive to the corresponding root index until 64 sequences are all detected. The root indexes are cyclically repeated from logical index 0 to logical index 837. For the relationship between logical root sequence indexes and physical root sequence indexes u, refer to [Table 9] and [Table 10] which will be described later.

A $u^{th}$ RZC sequence is defined by [Equation 4].

$$x_u(n) = e^{-j\frac{\pi u n(n+1)}{N_{ZC}}}, 0 \leq n \leq N_{ZC} - 1$$ [Equation 4]

The length $N_{ZC}$ of a ZC sequence is given in [Table 6]. A random access preamble having a ZCZ of length $N_{CS}-1$, $X_{u,v}(n)$ is defined from the $u^{th}$ RZC sequence using a cyclic shift as expressed in [Equation 5].

$$x_{u,v}(n) = x_u((n + C_v) \bmod N_{ZC})$$ [Equation 5]

A cyclic shift $C_v$ used in [Equation 5] is given by [Equation 6].

$$C_v = \begin{cases} vN_{CS} & v = 0, 1, \ldots, \lfloor N_{ZC}/N_{CS} \rfloor - 1, N_{CS} \neq 0 & \text{for unrestricted sets} \\ 0 & N_{CS} = 0 & \text{for unrestricted sets} \\ d_{start}\left\lfloor \dfrac{v}{n_{shift}^{RA}} \right\rfloor + (v \bmod n_{shift}^{RA})N_{CS} & v = 0, 1, \ldots, n_{shift}^{RA} n_{group}^{RA} + \overline{n}_{shift}^{RA} - 1 & \text{for restricted sets} \end{cases}$$ [Equation 6]

For preamble formats 0 to 4, $N_{CS}$ is given in [Table 7] and [Table 8]. A ZCZ configuration parameter is provided by a higher layer. A high-speed flag parameter provided by the higher layer indicates whether $C_v$ is selected from a restricted set or an unrestricted set. A parameter $d_u$ indicates a cyclic shift corresponding to a Doppler shift size $1/T_{SEQ}$ having a spacing of one subcarrier, given by the following equation.

$$d_u = \begin{cases} p & 0 \le p < N_{ZC}/2 \\ N_{ZC} - p & \text{otherwise} \end{cases}$$ [Equation 7]

In [Equation 7], the parameter p is a smallest non-negative integer satisfying (pu)mod $N_{ZC}$=1. A parameter for a restricted set of cyclic shifts depends on $d_u$. If $N_{CS} \le d_u < N_{ZC}/3$, parameters for the restricted set are given as [Equation 8].

$n_{shift}^{RA} = \lfloor d_u/N_{CS} \rfloor$ $d_{start} = 2d_u + n_{shift}^{RA} N_{CS}$ $n_{group}^{RA} = \lfloor N_{ZC}/d_{start} \rfloor$ $\overline{n}_{shift}^{RA} = \max(\lfloor N_{ZC} - 2d_u - n_{group}^{RA} d_{start})/N_{CS} \rfloor, 0)$ [Equation 8]

If $N_{ZC}/3 \le d_u \le (N_{ZC}-N_{CS})/2$, the parameters for the restricted set are given as [Equation 9].

$n_{shift}^{RA} = \lfloor (N_{ZC}-2d_u)/N_{CS} \rfloor$ $d_{start} = N_{ZC} - 2d_u + n_{shift}^{RA} N_{CS}$ $n_{group}^{RA} = \lfloor d_u/d_{start} \rfloor$ $\overline{n}_{shift}^{RA} = \min(\max(\lfloor d_u - n_{group}^{RA} d_{start})/N_{CS} \rfloor, 0), n_{shift}^{RA})$ For all other values of $d_u$, no cyclic shift exists in the restricted set.

[Table 6] below lists the lengths of a random access preamble sequence for preamble formats.

TABLE 6

| Preamble format | $N_{ZC}$ |
|---|---|
| 0-3 | 839 |
| 4 | 139 |

[Table 7] below illustrates a mapping relationship between ZCZ configurations and cyclic shift values $N_{CS}$ required for generating a random access preamble used in a restricted set or an unrestricted set, for preamble formats 0 to 3. Herein, $N_{CS}$ is the length of a base ZC sequence.

TABLE 7

| | $N_{CS}$ value | |
|---|---|---|
| zeroCorrelationZoneConfig | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

[Table 8] illustrates a mapping relationship between ZCZ configurations used for preamble format 4 and $N_{CS}$ values used for generation of RACH preambles.

TABLE 8

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

[Table 9] lists the orders of root ZC sequences for preamble formats 0 to 3.

TABLE 9

| Logical root sequence number | Physical root sequence number u (in increasing order of the corresponding logical sequence number) |
|---|---|
| 0-23 | 129, 710, 140, 699, 120, 719, 210, 629, 168, 671, 84, 755, 105, 734, 93, 746, 70, 769, 60, 779 2, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |

TABLE 9-continued

| Logical root sequence number | Physical root sequence number u (in increasing order of the corresponding logical sequence number) |
|---|---|
| 42-51 | 31, 808, 28, 811, 30, 809, 27, 812, 29, 810 |
| 52-63 | 24, 815, 48, 791, 68, 771, 74, 765,178, 661, 136, 703 |
| 64-75 | 86, 753, 78, 761, 43, 796, 39, 800, 20, 819, 21, 818 |
| 76-89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116-135 | 12, 827, 23, 816, 34, 805, 37, 802, 46, 793, 207, 632, 179, 660, 145, 694, 130, 709, 223, 616 |
| 136-167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168-203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204-263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264-327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328-383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384-455 | 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456-513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514-561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562-629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630-659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660-707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708-729 | 346, 493, 339, 500, 351, 488, 306, 533, 289, 550, 400, 439, 378, 461, 374, 465, 415, 424, 270, 569, 241, 598 |
| 730-751 | 231, 608, 260, 579, 268, 571, 276, 563, 409, 430, 398, 441, 290, 549, 304, 535, 308, 531, 358, 481, 316, 523 |
| 752-765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |
| 778-789 | 317, 522, 307, 532, 286, 553, 287, 552, 266, 573, 261, 578 |
| 790-795 | 236, 603, 303, 536, 356, 483 |
| 796-803 | 355, 484, 405, 434, 404, 435, 406, 433 |
| 804-809 | 235, 604, 267, 572, 302, 537 |
| 810-815 | 309, 530, 265, 574, 233, 606 |
| 816-819 | 367, 472, 296, 543 |
| 820-837 | 336, 503, 305, 534, 373, 466, 280, 559, 279, 560, 419, 420, 240, 599, 258, 581, 229, 610 |

[Table 10] lists the order of root ZC sequences for preamble format 4.

TABLE 10

| Logical root sequence number | Physical root sequence number u (in increasing order of the corresponding logical sequence number) | | | | | | | | | | | | | | | | | | |
|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | N/A | | | | | | | | | | | | | | | | | | |

3.5 PRACH Parameters

Parameters required to generate a PRACH preamble will be described below.

The PRACH parameters are indicated to a UE by higher-layer signaling (e.g., RRC signaling or MAC signaling). For example, a PRACH-ConfigSIB Information Element (IE) and a PRACH-Config IE are used to explicitly indicate a PRACH configuration (i.e. PRACH parameters) in system information and mobility control information. Particularly, the PRACH-Config IE is transmitted in System Information Block 2 (SIB2). [Table 11] illustrates an example of the PRACH-Config IE.

TABLE 11

```
-- ASN1START
PRACH-ConfigSIB ::=            SEQUENCE {
    rootSequenceIndex              INTEGER (0..837),
    prach-ConfigInfo               PRACH-ConfigInfo
}
PRACH-Config ::=               SEQUENCE {
    rootSequenceIndex              INTEGER (0..837),
    prach-ConfigInfo               PRACH-ConfigInfo
                           OPTIONAL    -- Need ON
}
PRACH-ConfigSCell-r10 ::=      SEQUENCE {
    prach-ConfigIndex-r10              INTEGER (0..63)
}
PRACH-ConfigInfo ::=           SEQUENCE {
    prach-ConfigIndex              INTEGER (0..63),
    highSpeedFlag                  BOOLEAN,
    zeroCorrelationZoneConfig      INTEGER (0..15),
    prach-FreqOffset               INTEGER (0..94)
}
-- ASN1STOP
```

In [Table 11], a highSpeedFlag parameter indicates whether cyclic shifts used for generation of RACH preambles are from a restricted set or an unrestricted set. A Prach-ConfigIndex parameter specifies a PRACH configuration and a preamble format. A prach-FreqOffset parameter indicates a frequency position at which an RACH preamble will be transmitted. A rootSequenceIndex parameter indicates a root ZC sequence. A zeroCorrelationZoneConfig parameter indicates a cyclic shift value $N_{CS}$.

3.6 Multiple Timing Advances (TAs) for CA

Figure 10:
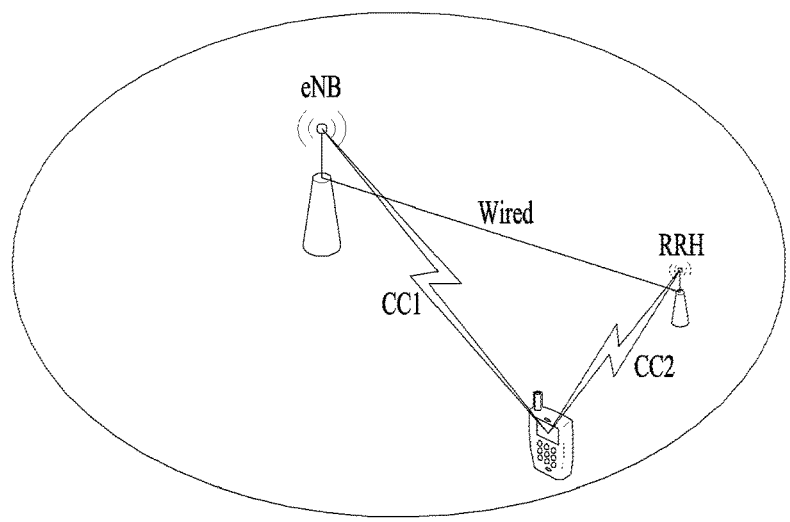
FIG. 10 illustrates aggregation of two or more carriers that are at geographically different locations according to an embodiment of the present invention.

FIG. 10 illustrates aggregation of two or more carriers at different geographical locations according to an embodiment of the present invention.

In a CA environment of the LTE-A system in which a plurality of Component Carriers (CCs) (i.e. cells) are aggregated, a TA value applicable to a specific CC (e.g., a PCC or PCell) may be applied commonly to a plurality of CCs configured in the same eNB. However, this is possible when the plurality of aggregated carriers are at the same geographical location.

On the other hand, it may occur in the future that a UE aggregates a plurality of different CCs in different frequency bands (i.e., much spaced from each other in the frequency domain) or having different propagation characteristics. In the case of a specific CC, repeaters such as a Remote Radio Header (RRH), a small cell, a pico cell, etc. may be deployed in a cell or at a cell boundary in order to extend coverage or remove a coverage hole. In other words, CA is applicable even to a case in which a plurality of carriers at different geographical locations are aggregated.

In this case, however, if a UE transmits UL data according to the method for applying one TA value commonly to all aggregated CCs, the UL transmission may adversely affect synchronization of UL signals transmitted in the plurality of CCs.

Referring to FIG. 10, the UE communicates with an eNB and an RRH using two aggregated CCs. For example, the UE communicates with the eNB directly in one CC, CC1 and with the eNB via the RRH in the other CC, CC2.

Then, the propagation delay (or reception timing at the eNB) of a UL signal transmitted in CC1 by the UE may be different from the propagation delay of a UL signal transmitted in CC2 by the UE due to the location of the UE, frequency characteristics, etc. If a plurality of CCs have different propagation delays as in this case, the eNB and the UE should use a plurality of TAs.

Figure 11:
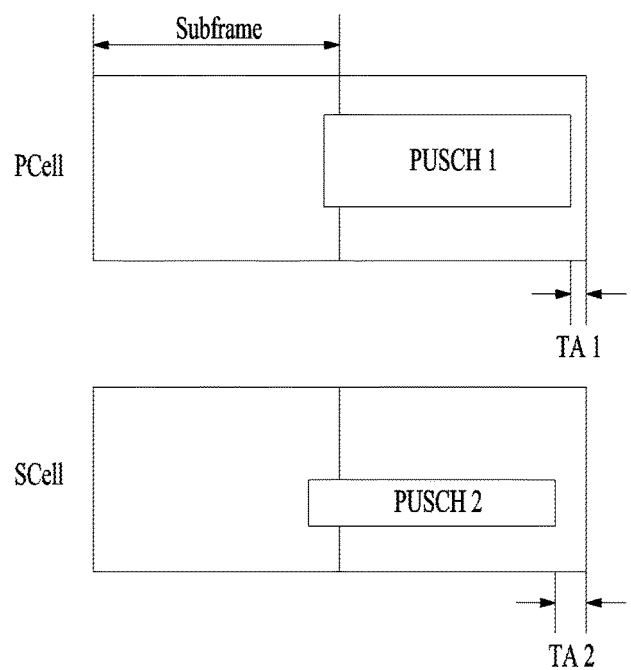
FIG. 11 illustrates transmission of UL data with different Timing Advances (TAs) in a Carrier Aggregation (CA) environment in which two Carrier Components (CCs) are aggregated according to an embodiment of the present invention.

FIG. 11 illustrates transmission of UL data with different TAs in a CA environment in which two CCs are aggregated according to an embodiment of the present invention.

FIG. 11(a) illustrates transmission of UL data (e.g., a PUSCH1 signal) in a PCell and FIG. 11(b) illustrates transmission of UL data (e.g., a PUSCH2 signal) in a SCell. A UE may apply different TAs, TA1 and TA2 in transmitting UL signals in the two CCs.

In a wireless access system according to the present invention, a TA may be allocated independently on a CC group basis, a CC group having one or more CCs. This may be referred to as a TA Group (TAG). That is, one TA is applied commonly to all CCs of one TAG. A TA may be determined based on a PCC for a TAG having the PCC, or a TA adjusted through a random access procedure in the PCC may be applied to the whole TAG.

On the other hand, for a TAG having only an SCC(s), a TA determined based on a specific SCC (e.g., a leader SCell) of the TAG may be applied to the whole TAG. For this purpose, it is preferred to also perform a random access procedure through an SCC, compared to the legacy LTE/LTE-A system. In this case, the random access procedure performed in a SCC may be the contention-based or contention-free random access procedure described in FIG. 7 or 8.

Now, a description will be given of methods for acquiring UL synchronization with two or more CCs, when a CA operation is performed in geographically spaced CCs.

4. Methods for Acquiring UL Synchronization in CA Environment

In general, legacy aggregated cells for CA belong to the same area. However, an attempt has been made to increase data throughput, extend cell coverage, and enhance user experience by deploying a plurality of small cells and/or RRHs. Accordingly, there is a need for aggregating a plurality of cells at different physical locations.

Cells are classified into a PCell group including a PCell and a SCell group that does not include a PCell. The size of each cell group is 1 or larger. Because the SCell group does not include a PCell, a leader SCell (L-SCell) representing other SCells may function as a PCell.

For a CA operation, a UE and/or an eNB may perform SCell addition and SCell activation for actual data transmission.

Further, the UE and/or the eNB may perform SCell modification for modifying the configuration of a SCell, SCell deletion for releasing the configuration of the SCell, and/or SCell deactivation for discontinuing data transmission and reception in the SCell. The SCell addition/deletion/modification may be performed by RRC signaling and the SCell activation/deactivation may be performed by a MAC message.

If a SCell at a different physical location is added, the TA value of the SCell may be different from that of a PCell. Accordingly, the UE may perform a random access procedure with the SCell to be added to acquire the TA value of the SCell.

According to embodiments of the present invention, it is assumed that one or more PCells and one or more SCells are configured for an eNB (a macro eNB or a first eNB) and one or more SCells are configured for an RRH or a small cell (a second eNB). For the convenience of description, if an eNB operates in a PCell, the eNB will be referred to as a PCell and if an eNB, an RRH, or a small cell operates in a SCell, the eNB, the RRH, or the small cell will be referred to as a SCell.

Hereinbelow, methods for performing a random access procedure to acquire UL synchronization with a SCell to be added by a UE will be described in detail.

4.1 Method for Performing Random Access Procedure in CA Environment—1

Figure 12:
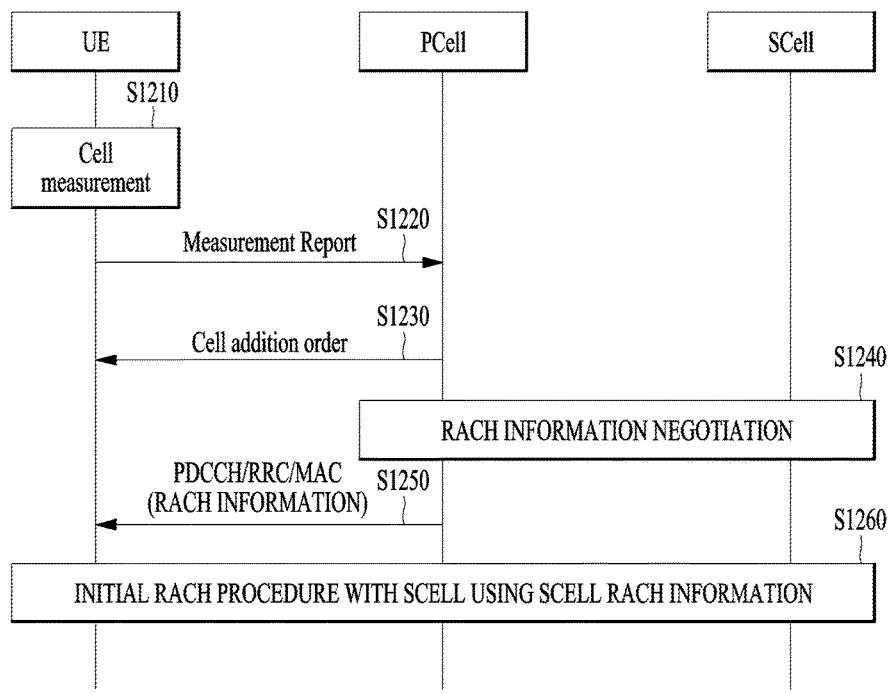
FIG. 12 is a diagram illustrating a signal flow for one of methods for performing a random access procedure to add a geographically spaced Secondary Cell (SCell) to CA according to an embodiment of the present invention.

FIG. 12 illustrates one of methods for performing a random access procedure to add a geographically spaced SCell to CA according to an embodiment of the present invention.

Referring to FIG. 12, a UE is communicating in a PCell of an eNB (accordingly, the eNB will be referred to as a PCell, for the convenience of description). To extend the cell coverage of the eNB, increase throughput, and/or improve a user environment of the UE, a geographically spaced SCell needs to be added.

The UE performs cell measurement to acquire information about channel states of neighbor cells, for cell addition (S1210).

After the cell measurement, the UE transmits a measurement report message including information about a candidate SCell to be added to CA from among the neighbor cells to the PCell (S1220).

Upon receipt of the measurement report message from the UE in step S1220, the PCell may transmit a cell addition order message including information (e.g., cell IDs, a cell list, etc.) about one or more SCells to the UE (S1230).

Also, the PCell may negotiate RACH information to be used for a random access procedure to be performed with the SCell to be added with the SCell through a backbone network. The RACH information includes information about an RACH resource area in which the RACH procedure will be performed and/or information about RACH parameters needed to generate an RACH preamble (refer to Clauses 3.3 to 3.5) (S1240).

Although only one SCell is shown in FIG. 12, if the UE reports two or more candidate SCells in step S1230, the PCell may perform step S1240 with the reported two or more candidate SCells.

The PCell acquires RACH information about the SCell through the RACH information negotiation of step S1240 and transmits the RACH information to the UE. The PCell may transmit the RACH information to the UE by a PDCCH signal, RRC signaling, or MAC signaling (S1250).

The UE may perform a contention-based initial RACH procedure with the SCell based on the RACH information received from the PCell. For the initial RACH procedure, the RACH procedure described in FIG. 7 may be referred to (S1260).

In other words, the UE may fast perform the initial RACH procedure with the SCell by acquiring the RACH information about the SCell in advance from the PCell without receiving a BCH signal and SIB2 information to acquire system information from the SCell.

In another embodiment of the present invention, step S1240 may be performed before step S1230. In this case, the cell addition order message of step S1230 may further include the RACH information transmitted in step S1250. Thus, step S1250 may be skipped.

Figure 13:
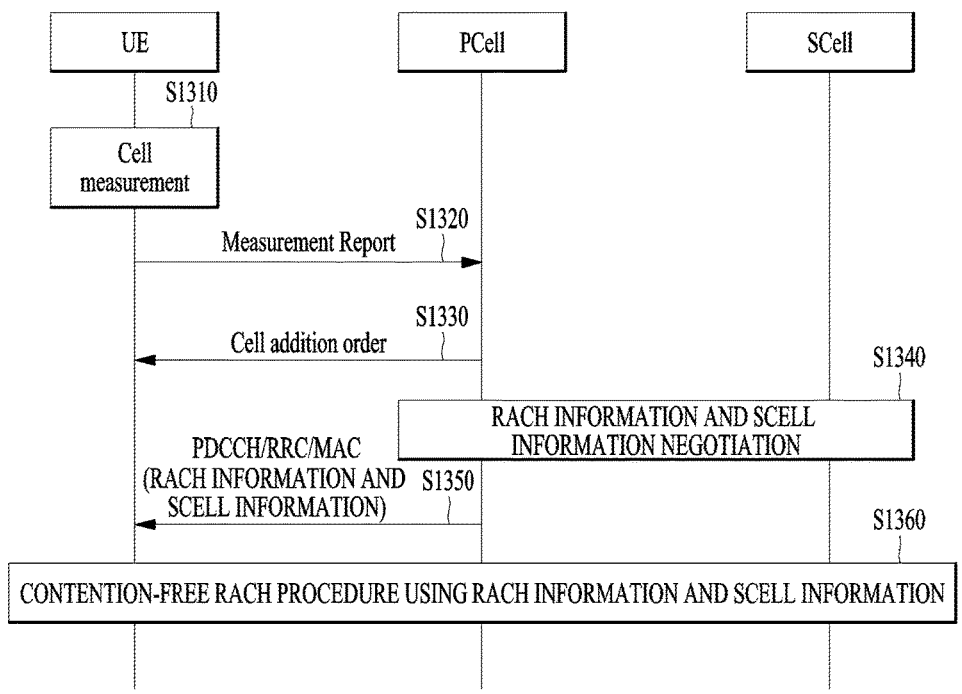
FIG. 13 is a diagram illustrating a signal flow for another of the methods for performing a random access procedure to add a geographically spaced SCell to CA according to an embodiment of the present invention.

FIG. 13 illustrates another of the methods for performing a random access procedure to add a geographically spaced SCell to CA according to an embodiment of the present invention.

Steps S1310 to S1330 of FIG. 13 are identical to steps S1210 to S1230 of FIG. 12 and thus will not be described to avoid redundancy.

Referring to FIG. 13, a PCell negotiates RACH information and SCell information with a SCell (S1340).

In step S1340, the PCell may acquire the SCell information as well as the RACH information about the SCell. The SCell information may include system information included in a SIB of the SCell and may further include DL synchronization information and/or SCell identification information about the SCell. Also, the RACH information may include information about a dedicated RACH preamble to perform a contention-free RACH procedure, compared to FIG. 12.

The PCell acquires the RACH information and the SCell information about the SCell through the RACH information and SCell information negotiation performed in step S1340 and transmits the acquired information to the UE. For example, the PCell may transmit the RACH information and the SCell information to the UE by a PDCCH signal, RRC signaling, or MAC signaling (S1350).

The UE may perform the contention-free RACH procedure with the SCell based on the RACH information received from the PCell. For the contention-free RACH procedure, the RACH procedure described in FIG. 8 may be referred to (S1360).

That is, the UE may fast perform the contention-free RACH procedure with the SCell by acquiring the RACH information and the SCell information about the SCell in advance from the PCell without receiving a BCH signal and SIB2 information to acquire a synchronization signal such as a PSS/SSS and system information from the SCell.

In another embodiment of the present invention, step S1340 may be performed before step S1330. In this case, the cell addition order message of step S1330 may further include the RACH information and/or the SCell information transmitted in step S1350. Thus, step S1350 may be skipped.

4.2 Method for Performing Random Access Procedure in CA Environment—2

A description will be given of RACH methods performed to maintain UL synchronization with added cells, after a cell addition procedure is completed in a CA environment.

Figure 14:
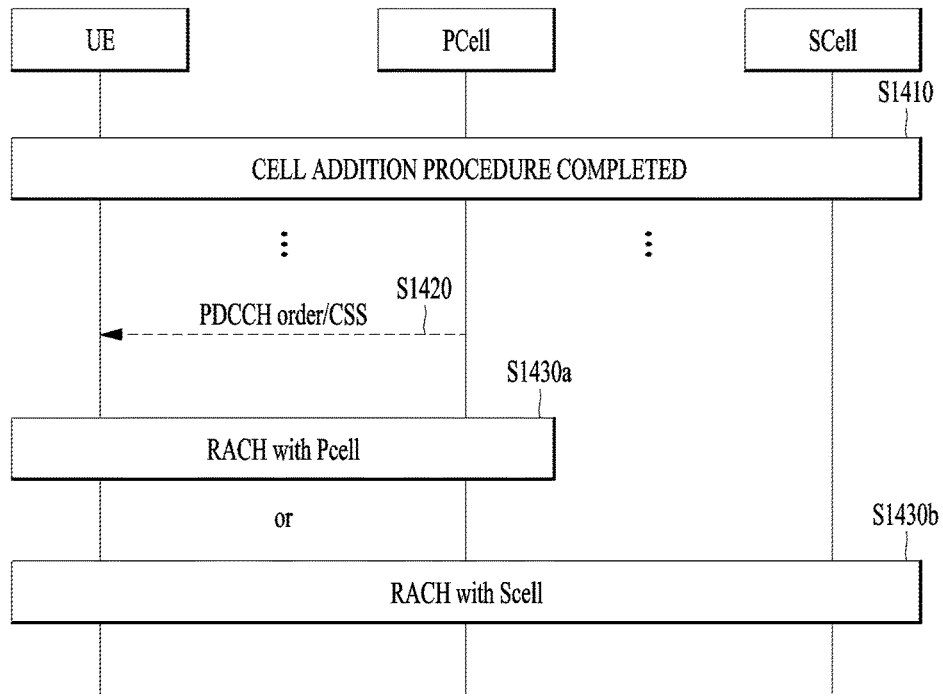
FIG. 14 is a diagram illustrating a signal flow for one of Random Access Channel (RACH) methods for maintaining UL synchronization after a cell addition procedure is completed according to an embodiment of the present invention.

FIG. 14 illustrates one of RACH methods for maintaining UL synchronization with added cells after completion of a cell addition procedure according to an embodiment of the present invention.

Referring to FIG. 14, a PCell managed by a serving eNB and a geographically spaced SCell form a CA environment. It is assumed that the SCell has been added in the methods described with reference to FIGS. 12 and 13 (S1410).

A predetermined time later, a UE needs to acquire UL synchronization with the SCell as well as the PCell, for communication. For this purpose, the PCell may command the UE to perform an RACH procedure for UL synchronization with the PCell and/or the SCell by a PDCCH order message (S1420).

In step S1420, the eNB may indicate a cell with which the RACH procedure will be performed. For example, the cell with which the RACH procedure will be performed may be indicated by a reserved bit of the PDCCH order message or one or more of predetermined fields of the PDCCH order message.

If the cell with which the RACH procedure will be performed is the PCell, the UE may perform the RACH procedure with the PCell by detecting a PDCCH signal masked with an RA-RNTI in a Common Search Space (CSS) (S1430*a*).

Or if the cell with which the RACH procedure will be performed is the SCell, the UE may perform the RACH procedure with the SCell by detecting a PDCCH signal masked with an RA-RNTI in a CSS of the SCell or a UE-specific Search Space (USS) (S1430*b*).

If both the PCell and the SCell are indicated for the RACH procedure in step S1420, both steps S1430*a* and S1430*b* may be performed.

In FIG. 14, the UE maintains connections to the PCell and the SCell. Therefore, since the UE already knows C-RNTIs used for the PCell and the SCell, the UE may perform a contention-free RACH procedure using the C-RNTIs in steps S1430*a* and S1430*b*. If a new UE enters the CA network, the PCell may allocate different RACH resources from the existing RACH resources to the new UE, thereby preventing collision between the RACH procedure of the new UE and the UL synchronization acquisition procedure of the existing UE. Further, collision with the new UE may be avoided in the RACH procedure by allocating a temporary C-RNTI different from the existing RA-RNTI.

In another embodiment of the present invention, the operation for indicating a cell with which the RACH procedure will be performed by a MAC message or RRC signaling in step S1420 of FIG. 14.

In a further embodiment of the present invention, a UE to which execution of the RACH procedure has been indicated by the PDCCH order in step S1420 of FIG. 14 may perform an initial RACH procedure with the PCell and/or the SCell.

The UE may maintain the UL synchronization with the PCell and the SCell using the method described with reference to FIG. 14.

Figure 15:
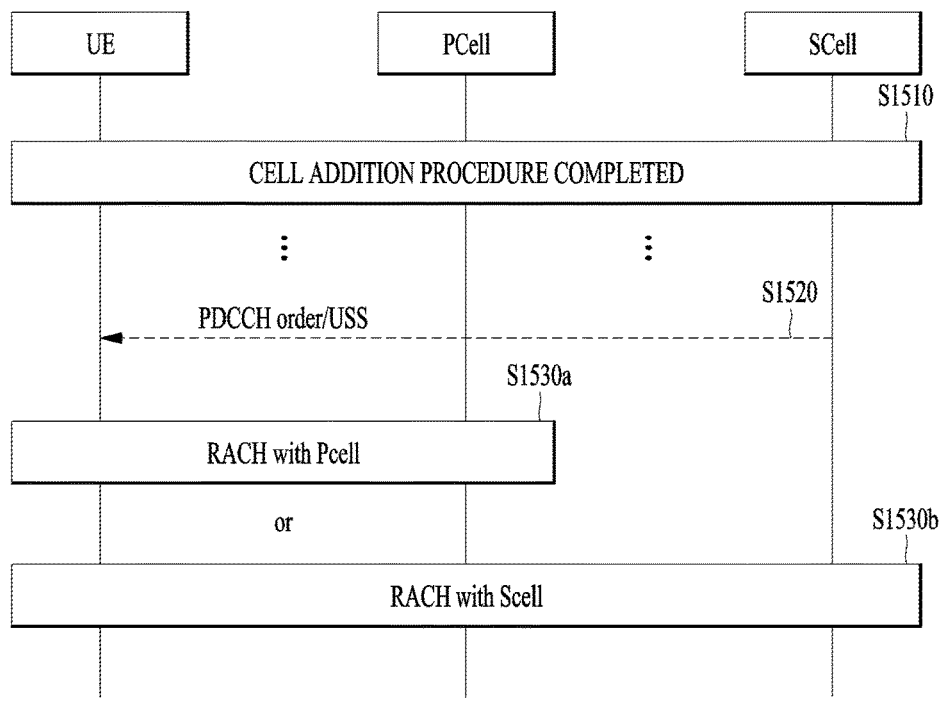
FIG. 15 is a diagram illustrating a signal flow for another of the RACH methods for maintaining UL synchronization after a cell addition procedure is completed according to an embodiment of the present invention.

FIG. 15 illustrates another of the RACH methods for maintaining UL synchronization after a cell addition procedure is completed according to an embodiment of the present invention.

Since the CA environment illustrated in FIG. 15 is identical to the CA environment described before with reference to FIG. 14, it will not be described herein. However, FIG. 15 is about a method for indicating performing of an RACH procedure for maintaining UL synchronization not by a PCell but by a SCell. Accordingly, only the difference from FIG. 14 will be described below.

Upon expiration of a predetermined time or upon generation of an event after the SCell is connected to a UE, there may be a need for maintaining UL synchronization. In this case, the SCell transmits a PDCCH order message to the UE so as to control the UE to perform an RACH procedure with the PCell and/or the SCell (S1520).

4.3 Method for Performing Random Access Procedure in CA Environment—3

A description will be given of a case where when a SCell is added in a CA environment, the added SCell is an L-SCell or a case where a SCell group is added.

An L-SCell of a SCell group may be a SCell having a lowest or highest cell index or a SCell with which a UE has performed an initial RACH procedure. Or a SCell set by the PCell may be an L-SCell.

When a SCell is added and the added SCell is an L-SCell, it is necessary to indicate that the SCell is an L-SCell to the UE. This is because the L-SCell may initiate addition of a SCell of a SCell group. The UE may be indicated whether the SCell is an L-SCell in the following methods.

Method 1. When a PCell initiates a SCell adding operation, the PCell indicates that an added SCell is an L-SCell.

Method 2. After a UE performs a random access procedure with a SCell, the UE receives information indicating whether the SCell is an L-SCell from the SCell.

Method 3. A first SCell added to a UE is automatically set as an L-SCell.

A method for adding a SCell of an SCell group will be described below.

Figure 16:
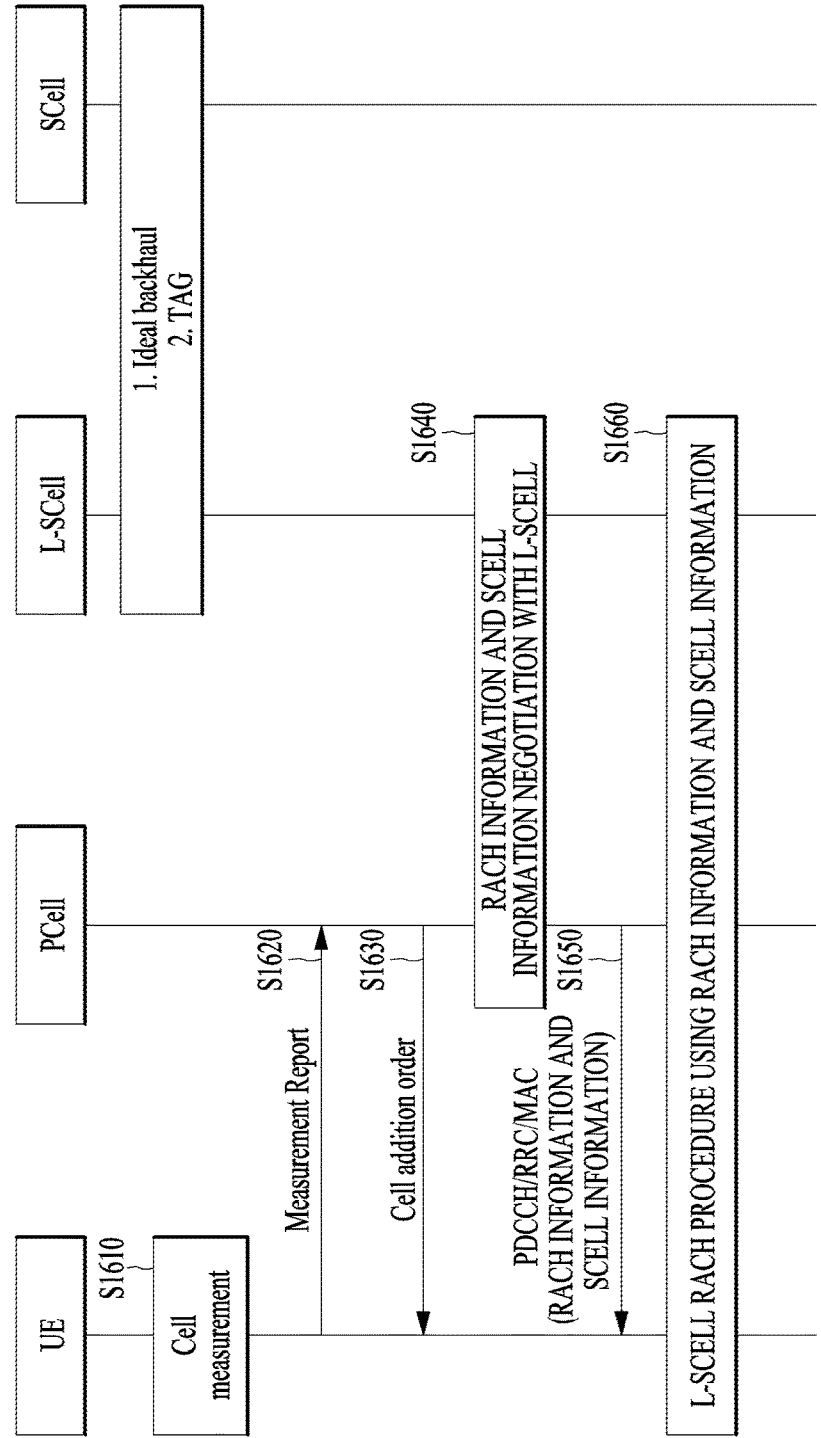
FIG. 16 is a diagram illustrating a signal flow for another of the methods for performing a random access procedure to add a geographically spaced leader SCell to CA according to an embodiment of the present invention.

FIG. 16 illustrates another of the methods for performing a random access procedure to add a geographically spaced L-SCell to CA according to an embodiment of the present invention.

Steps S1610 to S1630 of FIG. 16 are identical to steps S1210 to S1239 of FIG. 12 and thus their description is pursuant to the description of FIG. 12. Further, it is assumed that an L-SCell and the other SCells of a SCell group are connected via an ideal backhaul and belong to a TAG sharing the same TA value in the SCell group.

A PCell may negotiate RACH information and/or L-SCell information for use in an RACH procedure of an added L-SCell with the L-SCell via the backbone network. The RACH information includes information about an RACH resource area for performing the RACH procedure and/or information about RACH parameters needed to generate an RACH preamble (refer to Clauses 3.3. to 3.5). The L-SCell information may include system information such as DL synchronization information and a SCell ID (S1640).

The PCell acquires the RACH information about the L-SCell by the RACH information and/or SCell information negotiation of Step S1640 and transmits the acquired RACH information to the UE. The PCell may transmit the RACH information by a PDCCH signal, RRC signaling, or MAC signaling to the UE (S1650).

The UE may perform a contention-based or contention-free RACH procedure using the RACH information received from the PCell. The RACH procedure may be performed in the same manner as the RACH procedure described with reference to FIG. 7 and/or FIG. 8 (S1660).

That is, the UE may fast perform the initial RACH procedure or the contention-free RACH procedure by acquiring the RACH information about the SCell in advance from the PCell, without receiving a BCH signal and SIB2 information for acquiring system information from the L-SCell.

In FIG. 16, the PCell or the L-SCell may modify the L-SCell. The modification of the L-SCell should be shared among all of the PCell, the L-SCell, and the UE. For example, if the PCell modifies a SCell, the PCell may transmit the modification to the L-SCell and the UE via an X2 interface or by RRC signaling or a MAC message. If the L-SCell modifies the SCell, the L-SCell may transmit the modification to the PCell and the UE via an X2 interface or by RRC signaling or a MAC message.

In another embodiment of the present invention, step S1640 may be performed before step S1630. In this case, the cell addition order message of step S1630 may further include the RACH information and/or the SCell information transmitted in step S1650 and thus step S1650 may be skipped.

5. Apparatuses

Figure 17:
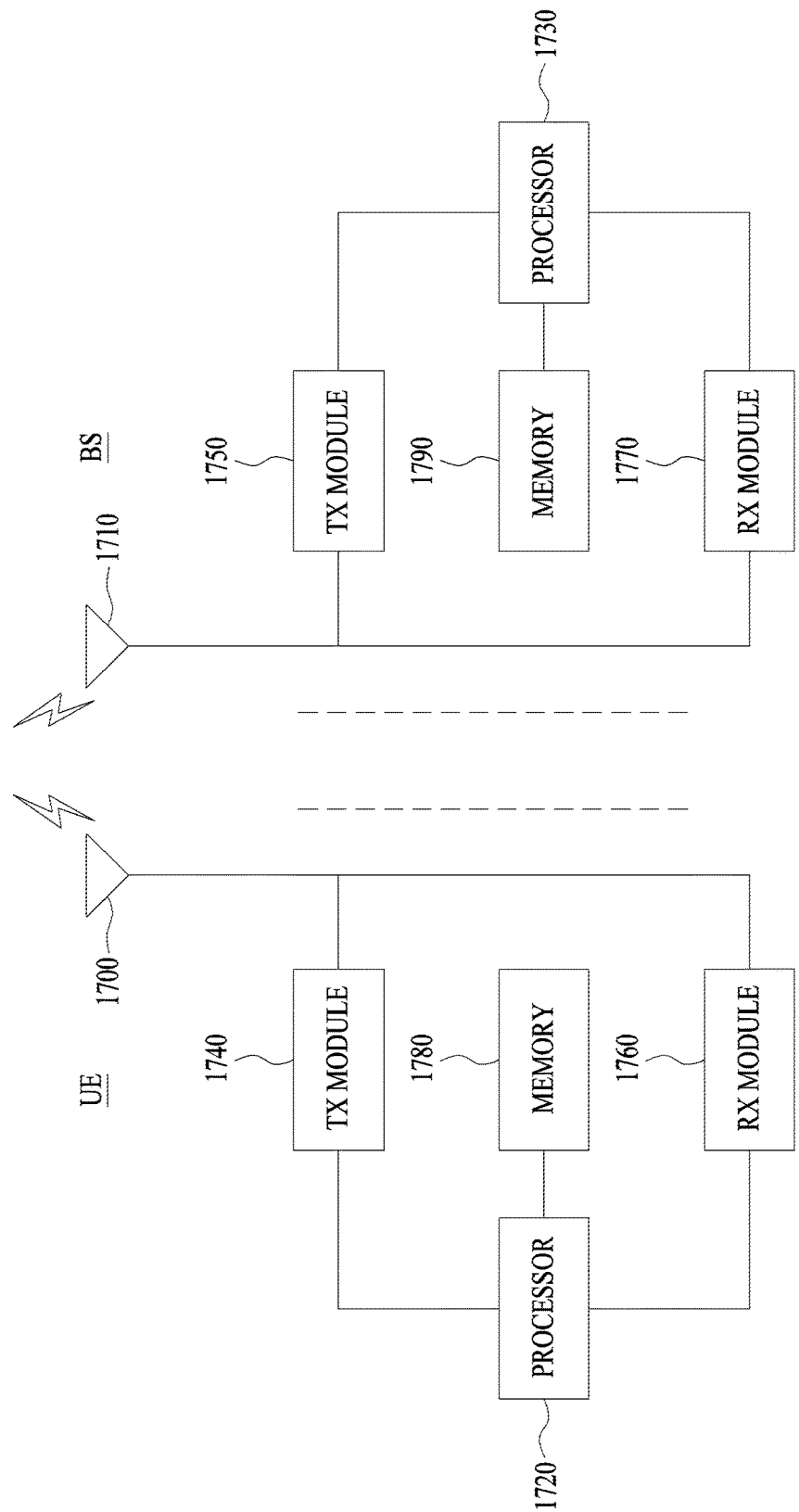
FIG. 17 is a block diagram of apparatuses for implementing the methods described in FIGS. 1 to 16.

Apparatuses illustrated in FIG. 17 are means that can implement the methods described before with reference to FIGS. 1 to 16.

A UE may act as a transmitter on a UL and as a receiver on a DL. A BS may act as a receiver on a UL and as a transmitter on a DL.

That is, each of the UE and the BS may include a Transmission (Tx) module 1740 or 1750 and a Reception (Rx) module 1760 or 1770, for controlling transmission and reception of information, data, and/or messages, and an antenna 1700 or 1710 for transmitting and receiving information, data, and/or messages.

Each of the UE and the BS may further include a processor 1720 or 1730 for implementing the afore-described embodiments of the present invention and a memory 1780 or 1790 for temporarily or permanently storing operations of the processor 1720 or 1730.

The embodiments of the present invention can be implemented using the components and functions of the afore-described UE and BS. For example, the processors of the BS and the UE may perform an operation for adding a geographically spaced serving cell to CA and an operation for acquiring UL synchronization with geographically spaced serving cells when CA is implemented with the serving cells by combining the methods described before in Clauses 1 to 4.

The Tx and Rx modules of the UE and the BS may perform a packet modulation/demodulation function for data transmission, a high-speed packet channel coding function, OFDMA packet scheduling, TDD packet scheduling, and/or channelization. Each of the UE and the BS of FIG. 17 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1780 or 1790 and executed by the processor 1720 or 1730. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

The invention claimed is:

1. A method for supporting acquisition of uplink synchronization in a wireless access system supporting Carrier Aggregation (CA), the method comprising:
negotiating, by a first base station (BS) of a Primary Cell (PCell) with a second BS of a Secondary Cell (SCell), Random Access Channel (RACH) parameter information related to a first random access procedure to be performed by a user equipment (UE) for acquiring uplink synchronization with the S Cell to be added to the CA after the negotiation;

acquiring, by the first BS, RACH information including both resource allocation information and the RACH parameter information, the resource allocation information indicating a RACH resource area of the SCell, wherein the RACH resource area includes resources for performing the first random access procedure, and wherein a RACH preamble is generated for the first random access procedure based on the RACH parameter information; and transmitting, by the first BS, the RACH information to the UE.

2. The method according to claim 1, wherein the SCell is geographically spaced apart from the PCell.

3. The method according to claim 1, wherein the RACH information is transmitted through a Physical Downlink Control Channel (PDCCH).

4. The method according to claim 1, further comprising:
transmitting to the UE a Physical Downlink Control Channel (PDCCH) order message indicating execution of a second random access procedure for acquiring uplink synchronization,
wherein the PDCCH order message includes information indicating a cell with which the second random access procedure is to be performed.

5. The method according to claim 1, wherein the RACH information includes system information used in the SCell.

6. A first Base Station (BS) for supporting acquisition of uplink synchronization in a wireless access system supporting Carrier Aggregation (CA), the first BS managing a Primary Cell (PCell) and comprising:
a transmitter;
a receiver; and
a processor that:

negotiates, through the transmitter and the receiver of the first BS of the PCell, with a second BS of a Secondary Cell (SCell), Random Access Channel (RACH) parameter information related to a first random access procedure to be performed by a user equipment (UE) for acquiring uplink synchronization with the S Cell to be added to the CA after the negotiation, acquires RACH information including both resource allocation information and the RACH parameter information, the resource allocation information indicating a RACH resource area, wherein the RACH resource area includes resources for performing the first random access procedure, and wherein a RACH preamble is generated for the first random access procedure based on the RACH parameter information, and transmits, through the transmitter, the RACH information to the UE.

7. The first BS according to claim 6, wherein the SCell is geographically spaced apart from the PCell.

8. The first BS according to claim 6, wherein the RACH information is transmitted through a Physical Downlink Control Channel (PDCCH).

9. The first BS according to claim 6, wherein the processor further controls the transmitter to transmit to the UE a Physical Downlink Control Channel (PDCCH) order message indicating execution of a second random access procedure for acquiring uplink synchronization, and
wherein the PDCCH order message includes information indicating a cell with which the second random access procedure is to be performed.

10. The first BS according to claim 6, wherein the RACH information includes system information used in the SCell.

* * * * *